(12) United States Patent
Jiang et al.

(10) Patent No.: US 11,831,480 B2
(45) Date of Patent: Nov. 28, 2023

(54) REFERENCE SIGNAL FOR WIRELESS COMMUNICATIONS

(71) Applicant: XCOM Labs, Inc., San Diego, CA (US)

(72) Inventors: Jing Jiang, San Diego, CA (US); Anthony Edet Ekpenyong, San Diego, CA (US); Mark Vernon Lane, San Diego, CA (US); Michael J Roe, San Diego, CA (US); Liang Mei, San Diego, CA (US); Hassan Ghozlan, San Diego, CA (US); Tamer Adel Kadous, San Diego, CA (US)

(73) Assignee: XCOM Labs, Inc., San Diego, CA (US)

( * ) Notice: Subject to any disclaimer, the term of this patent is extended or adjusted under 35 U.S.C. 154(b) by 108 days.

(21) Appl. No.: 17/451,232

(22) Filed: Oct. 18, 2021

(65) Prior Publication Data
US 2022/0123986 A1    Apr. 21, 2022

Related U.S. Application Data

(60) Provisional application No. 63/093,449, filed on Oct. 19, 2020.

(51) Int. Cl.
*H04B 7/06* (2006.01)
*H04L 27/26* (2006.01)
(Continued)

(52) U.S. Cl.
CPC ....... *H04L 27/2605* (2013.01); *H04B 7/0626* (2013.01); *H04L 5/0048* (2013.01);
(Continued)

(58) Field of Classification Search
CPC .............. H04B 7/0626; H04L 27/2605; H04L 27/2607; H04L 27/2613; H04L 27/2634;
(Continued)

(56) References Cited

U.S. PATENT DOCUMENTS

| 5,715,281 A | 2/1998 | Bly et al. |
| 6,366,622 B1 | 4/2002 | Brown et al. |

(Continued)

FOREIGN PATENT DOCUMENTS

| KR | 10-2014-0129985 | 11/2014 |
| KR | 10-2018-0071260 | 6/2018 |

OTHER PUBLICATIONS

International Search Report for International Application No. PCT/US2021/071881, dated Jan. 27, 2022.
(Continued)

*Primary Examiner* — Mohammad S Anwar
*Assistant Examiner* — Natali Pascual Peguero
(74) *Attorney, Agent, or Firm* — Knobbe, Martens, Olson & Bear, LLP

(57) ABSTRACT

Aspects of this disclosure relate receiving a reference symbol from at least one antenna. The reference symbol includes a portion of a first transmitted reference symbol and a portion of a second transmitted reference symbol. The first transmitted reference symbol includes a symbol and a cyclically shifted portion of the symbol having a cyclic shift length. The second transmitted reference symbol includes a cyclically shifted version of the first transmitted reference symbol that is cyclically shifted relative to the first transmitted reference symbol by the cyclic shift length. The reference symbol is processed. In certain embodiments, processing the reference symbol can account for (i) a frame
(Continued)

offset between uplink symbols and downlink symbols and (ii) another timing offset between downlink transmission and uplink reception.

20 Claims, 15 Drawing Sheets

(51) Int. Cl.
    *H04L 5/14*                      (2006.01)
    *H04L 5/00*                      (2006.01)

(52) U.S. Cl.
CPC ............ *H04L 5/14* (2013.01); *H04L 27/2607* (2013.01); *H04L 27/2613* (2013.01); *H04L 27/2634* (2013.01); *H04L 27/2675* (2013.01); *H04L 27/2678* (2013.01)

(58) Field of Classification Search
CPC ............ H04L 27/2656; H04L 27/2675; H04L 27/2678; H04L 5/0048; H04L 5/0078; H04L 5/14; H04L 27/2695; H04L 5/1469
See application file for complete search history.

(56) References Cited

U.S. PATENT DOCUMENTS

| | | |
|---|---|---|
| 6,636,568 B2 | 10/2003 | Kadous |
| 6,801,580 B2 | 10/2004 | Kadous |
| 6,868,128 B1 | 3/2005 | Lane |
| 6,873,606 B2 | 3/2005 | Agrawal |
| 6,917,821 B2 | 7/2005 | Kadous |
| 6,928,062 B2 | 8/2005 | Krishnan |
| 6,978,121 B1 | 12/2005 | Lane et al. |
| 7,012,883 B2 | 3/2006 | Jalali |
| 7,020,073 B2 | 3/2006 | Kadous |
| 7,027,796 B1 | 4/2006 | Linsky et al. |
| 7,039,001 B2 | 5/2006 | Krishnan |
| 7,042,857 B2 | 5/2006 | Krishnan |
| 7,095,790 B2 | 8/2006 | Krishnan |
| 7,145,940 B2 | 12/2006 | Gore |
| 7,167,684 B2 | 1/2007 | Kadous |
| 7,177,351 B2 | 2/2007 | Kadous |
| 7,184,713 B2 | 2/2007 | Kadous |
| 7,194,041 B2 | 3/2007 | Kadous |
| 7,236,535 B2 | 6/2007 | Subramaniam |
| 7,418,046 B2 | 8/2008 | Gore |
| 7,428,269 B2 | 9/2008 | Sampath |
| 7,457,639 B2 | 11/2008 | Subramaniam |
| 7,463,576 B2 | 12/2008 | Krishnan |
| 7,477,693 B2 | 1/2009 | Subramaniam |
| 7,508,748 B2 | 3/2009 | Kadous |
| 7,567,621 B2 | 7/2009 | Sampath |
| 7,606,326 B2 | 10/2009 | Krishnan |
| 7,668,125 B2 | 2/2010 | Kadous |
| 7,675,886 B2 | 3/2010 | Agrawal |
| 7,725,799 B2 | 5/2010 | Walker |
| 7,890,144 B2 | 2/2011 | Subramaniam |
| 7,903,615 B2 | 3/2011 | Gorokhov |
| 7,940,663 B2 | 5/2011 | Kadous |
| 7,948,959 B2 | 5/2011 | Wang |
| 7,974,359 B2 | 7/2011 | Gorokhov |
| 8,014,331 B2 | 9/2011 | Sarkar |
| 8,044,734 B2 | 10/2011 | Lane |
| 8,073,068 B2 | 12/2011 | Kim |
| 8,077,654 B2 | 12/2011 | Sutivong |
| 8,077,691 B2 | 12/2011 | Kadous |
| 8,098,635 B2 | 1/2012 | Montojo |
| 8,107,517 B2 | 1/2012 | Naguib |
| 8,139,672 B2 | 3/2012 | Gore |
| 8,204,470 B2 | 6/2012 | Onggosanusi et al. |
| 8,204,530 B2 | 6/2012 | Gorokhov |
| 8,229,423 B2 | 7/2012 | Sarkar |
| 8,250,428 B2 | 8/2012 | Sun |
| 8,259,637 B2 | 9/2012 | Bertrand et al. |
| 8,305,965 B2 | 11/2012 | Shen et al. |
| 8,306,096 B2 | 11/2012 | Sampath |
| 8,331,310 B2 | 12/2012 | Wang |
| 8,331,892 B2 | 12/2012 | Kadous |
| 8,351,456 B2 | 1/2013 | Kadous |
| 8,380,240 B2 | 2/2013 | Muharemovic et al. |
| 8,385,433 B2 | 2/2013 | Wang |
| 8,385,465 B2 | 2/2013 | Kadous |
| 8,391,196 B2 | 3/2013 | Gorokhov |
| 8,391,413 B2 | 3/2013 | Mantravadi |
| 8,443,255 B2 | 5/2013 | Jiang |
| 8,451,740 B2 | 5/2013 | Sampath |
| 8,451,776 B2 | 5/2013 | Dayal |
| 8,457,152 B2 | 6/2013 | Gorokhov |
| 8,462,859 B2 | 6/2013 | Sampath |
| 8,493,958 B2 | 7/2013 | Attar |
| 8,498,192 B2 | 7/2013 | Bhushan |
| 8,514,738 B2 | 8/2013 | Chandrasekhar et al. |
| 8,576,760 B2 | 11/2013 | Gorokhov |
| 8,594,056 B2 | 11/2013 | Rick et al. |
| 8,605,729 B2 | 12/2013 | Dayal |
| 8,605,839 B2 | 12/2013 | Jiang |
| 8,619,717 B2 | 12/2013 | Agrawal |
| 8,634,435 B2 | 1/2014 | Kadous |
| 8,639,190 B2 | 1/2014 | Gore |
| 8,640,012 B2 | 1/2014 | Ling |
| 8,654,705 B2 | 2/2014 | Wang |
| 8,654,715 B2 | 2/2014 | Wang |
| 8,655,400 B2 | 2/2014 | Kadous |
| 8,676,209 B2 | 3/2014 | Gorokhov |
| 8,724,545 B2 | 5/2014 | Dayal |
| 8,724,555 B2 | 5/2014 | Krishnan |
| 8,737,470 B2 | 5/2014 | Walker |
| 8,760,994 B2 | 6/2014 | Wang |
| 8,761,062 B2 | 6/2014 | Chandrasekhar et al. |
| 8,767,641 B2 | 7/2014 | Chen et al. |
| 8,767,885 B2 | 7/2014 | Sampath |
| 8,780,790 B2 | 7/2014 | Sarkar |
| 8,825,860 B2 | 9/2014 | Linsky |
| 8,830,934 B2 | 9/2014 | Banister |
| 8,842,693 B2 | 9/2014 | Agrawal |
| 8,848,607 B2 | 9/2014 | Wang |
| 8,855,001 B2 | 10/2014 | Gorokhov |
| 8,874,998 B2 | 10/2014 | Walker |
| 8,879,445 B2 | 11/2014 | Sadek |
| 8,885,744 B2 | 11/2014 | Kadous |
| 8,886,126 B2 | 11/2014 | Mantravadi |
| 8,886,239 B2 | 11/2014 | Dayal |
| 8,897,181 B2 | 11/2014 | Wang |
| 8,897,220 B2 | 11/2014 | Kadous |
| 8,903,021 B2 | 12/2014 | Mantravadi |
| 8,908,496 B2 | 12/2014 | Kadous |
| 8,923,109 B2 | 12/2014 | Wang |
| 8,923,208 B2 | 12/2014 | Dayal |
| 8,954,063 B2 | 2/2015 | Sarkar |
| 8,971,461 B2 | 3/2015 | Sampath |
| 8,971,823 B2 | 3/2015 | Gore |
| 8,982,832 B2 | 3/2015 | Ling |
| 9,001,641 B2 | 4/2015 | Bertrand et al. |
| 9,001,756 B2 | 4/2015 | Chen et al. |
| 9,036,538 B2 | 5/2015 | Palanki |
| 9,084,242 B2 | 7/2015 | Chen et al. |
| 9,088,389 B2 | 7/2015 | Gorokhov |
| 9,106,287 B2 | 8/2015 | Wang |
| 9,113,488 B2 | 8/2015 | Oguz |
| 9,136,974 B2 | 9/2015 | Gorokhov |
| 9,143,957 B2 | 9/2015 | Sadek |
| 9,144,036 B2 | 9/2015 | Gorokhov |
| 9,144,084 B2 | 9/2015 | Sadek |
| 9,148,256 B2 | 9/2015 | Sampath |
| 9,154,179 B2 | 10/2015 | Gudem |
| 9,154,211 B2 | 10/2015 | Sampath |
| 9,154,277 B2 | 10/2015 | Ekpenyong et al. |
| 9,155,106 B2 | 10/2015 | Krishnan |
| 9,161,232 B2 | 10/2015 | Linsky |
| 9,161,233 B2 | 10/2015 | Wang |
| 9,172,402 B2 | 10/2015 | Gudem |
| 9,172,453 B2 | 10/2015 | Wang |
| 9,179,319 B2 | 11/2015 | Gore |

(56) References Cited

U.S. PATENT DOCUMENTS

| | | |
|---|---|---|
| 9,184,870 B2 | 11/2015 | Sampath |
| 9,185,718 B2 | 11/2015 | Kadous |
| 9,185,720 B2 | 11/2015 | Mantravadi |
| 9,226,173 B2 | 12/2015 | Sadek |
| 9,231,666 B2 | 1/2016 | Muharemovic et al. |
| 9,246,560 B2 | 1/2016 | Sampath |
| 9,253,658 B2 | 2/2016 | Sadek |
| 9,277,164 B2 | 3/2016 | Lane |
| 9,277,564 B2 | 3/2016 | Wang |
| 9,282,462 B2 | 3/2016 | Dayal |
| 9,307,544 B2 | 4/2016 | Gore |
| 9,319,928 B2 | 4/2016 | Bertrand et al. |
| 9,398,602 B2 | 7/2016 | Kadous |
| 9,401,748 B2 | 7/2016 | Chen et al. |
| 9,408,220 B2 | 8/2016 | Gore |
| 9,413,509 B2 | 8/2016 | Chen et al. |
| 9,451,480 B2 | 9/2016 | Huang |
| 9,461,736 B2 | 10/2016 | Bhushan |
| 9,473,219 B2 | 10/2016 | Muharemovic et al. |
| 9,474,075 B2 | 10/2016 | Yavuz |
| 9,532,230 B2 | 12/2016 | Bendlin et al. |
| 9,571,250 B2 | 2/2017 | Chen et al. |
| 9,578,649 B2 | 2/2017 | Dayal |
| 9,585,156 B2 | 2/2017 | Bhattad |
| 9,603,040 B2 | 3/2017 | Chandrasekhar et al. |
| 9,603,141 B2 | 3/2017 | Chen et al. |
| 9,628,311 B2 | 4/2017 | Bertrand et al. |
| 9,660,776 B2 | 5/2017 | Kadous |
| 9,667,397 B2 | 5/2017 | Chen et al. |
| 9,673,948 B2 | 6/2017 | Jiang |
| 9,680,522 B2 | 6/2017 | Ekpenyong et al. |
| 9,706,568 B2 | 7/2017 | Ekpenyong |
| 9,750,014 B2 | 8/2017 | Sadek |
| 9,762,372 B2 | 9/2017 | Ekpenyong et al. |
| 9,775,151 B2 | 9/2017 | Jung et al. |
| 9,781,693 B2 | 10/2017 | Ji |
| 9,788,361 B2 | 10/2017 | Valliappan |
| 9,814,040 B2 | 11/2017 | Bhushan |
| 9,814,058 B2 | 11/2017 | Jiang |
| 9,819,471 B2 | 11/2017 | Chen et al. |
| 9,825,798 B1 | 11/2017 | Sun |
| 9,832,785 B2 | 11/2017 | Kadous |
| 9,847,862 B2 | 12/2017 | Soriaga |
| 9,860,033 B2 | 1/2018 | Kadous |
| 9,867,194 B2 | 1/2018 | Kadous |
| 9,877,230 B2 | 1/2018 | Chen et al. |
| 9,888,389 B2 | 2/2018 | Bendlin et al. |
| 9,894,701 B2 | 2/2018 | Ang |
| 9,923,690 B2 | 3/2018 | Ekpenyong |
| 9,924,368 B2 | 3/2018 | Valliappan |
| 9,929,812 B2 | 3/2018 | Manolakos |
| 9,936,400 B2 | 4/2018 | Lee |
| 9,936,469 B2 | 4/2018 | Ji |
| 9,936,498 B2 | 4/2018 | Azarian Yazdi |
| 9,936,519 B2 | 4/2018 | Mukkavilli |
| 9,954,668 B2 | 4/2018 | Lee |
| 9,955,365 B2 | 4/2018 | Lin |
| 9,955,497 B2 | 4/2018 | Jiang |
| 9,967,070 B2 | 5/2018 | Jiang |
| 9,974,093 B2 | 5/2018 | Lin |
| 9,979,450 B2 | 5/2018 | Jiang |
| 9,980,271 B2 | 5/2018 | Soriaga |
| 9,983,290 B2 | 5/2018 | Pajona et al. |
| 9,985,802 B2 | 5/2018 | Jiang |
| 9,992,790 B2 | 6/2018 | Jiang |
| 10,009,160 B2 | 6/2018 | Jiang |
| 10,009,912 B2 | 6/2018 | Abraham |
| 10,027,462 B2 | 7/2018 | Jiang |
| 10,028,240 B2 | 7/2018 | Ji |
| 10,033,577 B2 | 7/2018 | Soriaga |
| 10,033,578 B2 | 7/2018 | Soriaga |
| 10,038,528 B2 | 7/2018 | Jiang |
| 10,038,544 B2 | 7/2018 | Zeng |
| 10,044,381 B2 | 8/2018 | Lane et al. |
| 10,044,438 B2 | 8/2018 | Kadous |
| 10,044,459 B2 | 8/2018 | Chendamarai Kannan |
| 10,057,019 B2 | 8/2018 | Jiang |
| 10,075,187 B2 | 9/2018 | Jiang |
| 10,075,194 B2 | 9/2018 | Lin |
| 10,075,271 B2 | 9/2018 | Soriaga |
| 10,075,970 B2 | 9/2018 | Jiang |
| 10,080,214 B2 | 9/2018 | Lin |
| 10,084,563 B2 | 9/2018 | Park |
| 10,084,578 B2 | 9/2018 | Azarian Yazdi |
| 10,091,789 B2 | 10/2018 | Valliappan |
| 10,091,810 B2 | 10/2018 | Zeng |
| 10,097,260 B2 | 10/2018 | Hosseini |
| 10,098,059 B2 | 10/2018 | Ly |
| 10,104,616 B2 | 10/2018 | Ang |
| 10,104,624 B2 | 10/2018 | Sundararajan |
| 10,122,559 B2 | 11/2018 | Manolakos |
| 10,123,219 B2 | 11/2018 | Bhushan |
| 10,135,591 B2 | 11/2018 | Chen |
| 10,141,991 B2 | 11/2018 | Jiang |
| 10,142,060 B2 | 11/2018 | Xu |
| 10,158,393 B2 | 12/2018 | Ekpenyong et al. |
| 10,159,097 B2 | 12/2018 | Ji |
| 10,162,843 B1 | 12/2018 | Srivastav et al. |
| 10,177,826 B2 | 1/2019 | Manolakos |
| 10,178,649 B2 | 1/2019 | Liu |
| 10,182,404 B2 | 1/2019 | Prakash |
| 10,182,426 B2 | 1/2019 | Ji |
| 10,200,140 B2 | 2/2019 | Li |
| 10,200,994 B2 | 2/2019 | Park |
| 10,201,014 B2 | 2/2019 | Kadous |
| 10,205,618 B2 | 2/2019 | Wang |
| 10,206,181 B2 | 2/2019 | Ekpenyong et al. |
| 10,218,406 B2 | 2/2019 | Liu |
| 10,219,235 B2 | 2/2019 | Patel |
| 10,219,252 B2 | 2/2019 | Chendamarai Kannan |
| 10,219,300 B2 | 2/2019 | Gorokhov |
| 10,224,966 B2 | 3/2019 | Li |
| 10,225,065 B2 | 3/2019 | Ang |
| 10,225,818 B2 | 3/2019 | Liu |
| 10,230,502 B2 | 3/2019 | Ji |
| 10,231,259 B2 | 3/2019 | Lin |
| 10,237,030 B2 | 3/2019 | Azarian Yazdi |
| 10,237,037 B2 | 3/2019 | Jiang |
| 10,237,889 B2 | 3/2019 | Sundararajan |
| 10,257,844 B2 | 4/2019 | Yang |
| 10,257,848 B2 | 4/2019 | Sun |
| 10,257,851 B2 | 4/2019 | Patel |
| 10,263,745 B2 | 4/2019 | Soriaga |
| 10,263,754 B2 | 4/2019 | Lin |
| 10,263,817 B1 | 4/2019 | Roe et al. |
| 10,264,541 B2 | 4/2019 | Patel |
| 10,270,562 B2 | 4/2019 | Yang |
| 10,278,177 B2 | 4/2019 | Sadek |
| 10,285,189 B2 | 5/2019 | Sundararajan |
| 10,291,372 B2 | 5/2019 | Azarian Yazdi |
| 10,291,379 B2 | 5/2019 | Kadous |
| 10,292,093 B2 | 5/2019 | Chendamarai Kannan |
| 10,298,289 B2 | 5/2019 | Yerramalli |
| 10,298,434 B2 | 5/2019 | Manolakos |
| 10,299,284 B2 | 5/2019 | Sadek |
| 10,313,160 B2 | 6/2019 | Jiang |
| 10,314,065 B2 | 6/2019 | Yang |
| 10,320,428 B2 | 6/2019 | Sarkis |
| 10,327,241 B2 | 6/2019 | Kadous |
| 10,327,261 B2 | 6/2019 | Naghshvar |
| 10,333,752 B2 | 6/2019 | Jiang |
| 10,334,450 B2 | 6/2019 | Bendlin et al. |
| 10,334,546 B2 | 6/2019 | Chendamarai Kannan |
| 10,334,594 B2 | 6/2019 | Sundararajan |
| 10,341,976 B2 | 7/2019 | Ji |
| 10,342,012 B2 | 7/2019 | Mukkavilli |
| 10,348,329 B2 | 7/2019 | Soriaga |
| 10,348,432 B2 | 7/2019 | Chen et al. |
| 10,349,404 B2 | 7/2019 | Chendamarai Kannan |
| 10,354,009 B2 | 7/2019 | Liang et al. |
| 10,355,803 B2 | 7/2019 | Manolakos |
| 10,356,800 B2 | 7/2019 | Manolakos |
| 10,356,811 B2 | 7/2019 | Luo |
| 10,356,816 B2 | 7/2019 | Valliappan |

(56) References Cited

U.S. PATENT DOCUMENTS

| | | | |
|---|---|---|---|
| 10,362,574 | B2 | 7/2019 | Chendamarai Kannan |
| 10,367,621 | B2 | 7/2019 | Jiang |
| 10,368,301 | B2 | 7/2019 | Chendamarai Kannan |
| 10,368,305 | B2 | 7/2019 | Radulescu |
| 10,368,348 | B2 | 7/2019 | Chendamarai Kannan |
| 10,368,372 | B2 | 7/2019 | Chendamarai Kannan |
| 10,374,777 | B2 | 8/2019 | Kadous |
| 10,375,690 | B2 | 8/2019 | Chen et al. |
| 10,375,711 | B2 | 8/2019 | Sadek |
| 10,375,718 | B2 | 8/2019 | Manolakos |
| 10,382,177 | B2 | 8/2019 | Jiang |
| 10,382,233 | B2 | 8/2019 | Abdelghaffar |
| 10,389,503 | B2 | 8/2019 | Soriaga |
| 10,389,504 | B2 | 8/2019 | Soriaga |
| 10,390,361 | B2 | 8/2019 | Mukkavilli |
| 10,390,362 | B2 | 8/2019 | Gupta |
| 10,396,962 | B2 | 8/2019 | Li |
| 10,404,332 | B2 | 9/2019 | Ji |
| 10,404,340 | B2 | 9/2019 | Manolakos |
| 10,404,434 | B2 | 9/2019 | Kannan |
| 10,404,442 | B2 | 9/2019 | Chen et al. |
| 10,404,509 | B2 | 9/2019 | Sun |
| 10,405,228 | B2 | 9/2019 | Liu |
| 10,405,242 | B2 | 9/2019 | Kadous |
| 10,405,262 | B2 | 9/2019 | Chendamarai Kannan |
| 10,405,278 | B2 | 9/2019 | Ang |
| 10,405,335 | B2 | 9/2019 | Barghi |
| 10,411,782 | B2 | 9/2019 | Namgoong |
| 10,411,795 | B2 | 9/2019 | Liu |
| 10,412,632 | B2 | 9/2019 | Li |
| 10,412,719 | B2 | 9/2019 | Chen |
| 10,412,733 | B2 | 9/2019 | Sun |
| 10,412,760 | B2 | 9/2019 | Ekpenyong |
| 10,419,171 | B2 | 9/2019 | Park |
| 10,419,244 | B2 | 9/2019 | Jiang |
| 10,419,749 | B2 | 9/2019 | Roe et al. |
| 10,425,824 | B2 | 9/2019 | Li |
| 10,425,923 | B2 | 9/2019 | Wang |
| 10,425,945 | B2 | 9/2019 | Sun |
| 10,432,357 | B2 | 10/2019 | Yang |
| 10,432,386 | B2 | 10/2019 | Chen et al. |
| 10,433,159 | B2 | 10/2019 | Ekpenyong et al. |
| 10,433,179 | B2 | 10/2019 | Zhang |
| 10,440,657 | B2 | 10/2019 | Sundararajan |
| 10,440,726 | B2 | 10/2019 | Jiang |
| 10,440,729 | B2 | 10/2019 | Li |
| 10,447,426 | B2 | 10/2019 | Sundararajan |
| 10,447,447 | B2 | 10/2019 | Namgoong |
| 10,448,296 | B2 | 10/2019 | Radulescu |
| 10,448,380 | B2 | 10/2019 | Islam |
| 10,454,541 | B2 | 10/2019 | Sundararajan |
| 10,455,457 | B2 | 10/2019 | Sadek |
| 10,461,797 | B2 | 10/2019 | Liu |
| 10,461,889 | B2 | 10/2019 | Park |
| 10,461,891 | B2 | 10/2019 | Park |
| 10,461,976 | B2 | 10/2019 | Chen |
| 10,469,203 | B2 | 11/2019 | Sankar |
| 10,476,641 | B2 | 11/2019 | Yang |
| 10,476,650 | B2 | 11/2019 | Yang |
| 10,476,781 | B2 | 11/2019 | Luo |
| 10,477,437 | B2 | 11/2019 | Zhang |
| 10,477,466 | B2 | 11/2019 | Ly |
| 10,477,526 | B2 | 11/2019 | Chendamarai Kannan |
| 10,484,054 | B2 | 11/2019 | Sundararajan |
| 10,484,129 | B2 | 11/2019 | Jiang |
| 10,484,135 | B2 | 11/2019 | Mallik |
| 10,484,146 | B2 | 11/2019 | Sun |
| 10,484,878 | B2 | 11/2019 | Patel |
| 10,484,934 | B2 | 11/2019 | Malik |
| 10,484,935 | B2 | 11/2019 | Li |
| 10,484,954 | B2 | 11/2019 | Liu |
| 10,484,959 | B2 | 11/2019 | Liu |
| 10,484,972 | B2 | 11/2019 | Lin |
| 10,484,992 | B2 | 11/2019 | Sadek |
| 10,485,016 | B2 | 11/2019 | Zeng |
| 10,485,019 | B2 | 11/2019 | Ekpenyong |
| 10,492,181 | B2 | 11/2019 | Jiang |
| 10,498,503 | B2 | 12/2019 | Tavildar |
| 10,499,393 | B2 | 12/2019 | Mukkavilli |
| 10,505,701 | B2 | 12/2019 | Ang |
| 10,506,573 | B2 | 12/2019 | Chen et al. |
| 10,506,629 | B2 | 12/2019 | Sun et al. |
| 10,511,093 | B2 | 12/2019 | Shamblin et al. |
| 10,511,399 | B2 | 12/2019 | Sun et al. |
| 10,511,987 | B2 | 12/2019 | Liu et al. |
| 10,512,098 | B2 | 12/2019 | Jiang |
| 10,516,618 | B2 | 12/2019 | Barghi et al. |
| 10,523,300 | B2 | 12/2019 | Malik et al. |
| 10,523,369 | B2 | 12/2019 | Yang |
| 10,524,257 | B2 | 12/2019 | Li |
| 10,524,259 | B2 | 12/2019 | Azarian Yazdi |
| 10,524,278 | B2 | 12/2019 | Abraham |
| 10,536,966 | B2 | 1/2020 | Liu et al. |
| 10,541,780 | B2 | 1/2020 | Mukkavilli |
| 10,541,791 | B2 | 1/2020 | Ji |
| 10,541,851 | B2 | 1/2020 | Malik et al. |
| 10,542,436 | B2 | 1/2020 | Liu et al. |
| 10,542,541 | B2 | 1/2020 | Valliappan et al. |
| 10,542,543 | B2 | 1/2020 | Yerramalli et al. |
| 10,547,402 | B2 | 1/2020 | Li |
| 10,547,415 | B2 | 1/2020 | Jiang |
| 10,547,422 | B2 | 1/2020 | Yoo et al. |
| 10,547,494 | B2 | 1/2020 | Liu et al. |
| 10,548,020 | B2 | 1/2020 | Khoshnevisan et al. |
| 10,548,131 | B2 | 1/2020 | Yerramalli et al. |
| 10,548,144 | B2 | 1/2020 | Soriaga |
| 10,548,153 | B2 | 1/2020 | Akkarakaran et al. |
| 10,548,155 | B2 | 1/2020 | Manolakos |
| 10,554,462 | B2 | 2/2020 | Yang |
| 10,554,539 | B2 | 2/2020 | Luo |
| 10,554,540 | B2 | 2/2020 | Luo |
| 10,555,203 | B2 | 2/2020 | Malik |
| 10,555,210 | B2 | 2/2020 | Sun |
| 10,560,304 | B2 | 2/2020 | Lei |
| 10,567,118 | B2 | 2/2020 | Yang |
| 10,567,204 | B2 | 2/2020 | Bertrand et al. |
| 10,568,128 | B2 | 2/2020 | Li |
| 10,574,565 | B2 | 2/2020 | Luo |
| 10,575,185 | B2 | 2/2020 | Li |
| 10,581,572 | B2 | 3/2020 | Chendamarai Kannan |
| 10,581,722 | B2 | 3/2020 | Luo |
| 10,587,438 | B2 | 3/2020 | Roe et al. |
| 10,587,497 | B2 | 3/2020 | Luo |
| 10,594,532 | B2 | 3/2020 | Wang |
| 10,595,225 | B2 | 3/2020 | John Wilson |
| 10,595,302 | B2 | 3/2020 | Mukkavilli |
| 10,595,327 | B2 | 3/2020 | Sadek |
| 10,595,332 | B2 | 3/2020 | Jiang |
| 10,595,342 | B2 | 3/2020 | Islam |
| 10,602,515 | B2 | 3/2020 | Ly |
| 10,602,543 | B2 | 3/2020 | Sun |
| 10,608,785 | B2 | 3/2020 | Wang |
| 10,609,660 | B2 | 3/2020 | Liu |
| 10,615,825 | B2 | 4/2020 | Sarkis |
| 10,616,737 | B2 | 4/2020 | Liu |
| 10,616,912 | B2 | 4/2020 | Chendamarai Kannan |
| 10,616,914 | B2 | 4/2020 | Manolakos |
| 10,623,138 | B2 | 4/2020 | Yang |
| 10,623,163 | B2 | 4/2020 | Sun |
| 10,623,208 | B2 | 4/2020 | Jiang |
| 10,624,079 | B2 | 4/2020 | Xu |
| 10,630,450 | B2 | 4/2020 | Sun |
| 10,631,323 | B2 | 4/2020 | Zeng |
| 10,687,247 | B2 | 6/2020 | Chen et al. |
| 10,693,692 | B2 | 6/2020 | Hadani et al. |
| 10,694,453 | B2 | 6/2020 | Jha et al. |
| 10,749,635 | B2 | 8/2020 | Li et al. |
| 10,764,573 | B2 | 9/2020 | Roe et al. |
| 10,785,699 | B2 | 9/2020 | Sirotkin et al. |
| 10,924,249 | B2 | 2/2021 | Chen et al. |
| 10,942,243 | B2 | 3/2021 | Pajona et al. |
| 10,992,358 | B2 | 4/2021 | Sirotkin et al. |
| 10,999,753 | B2 | 5/2021 | Chandrasekhar et al. |
| 11,005,632 | B2 | 5/2021 | Ekpenyong |

(56) References Cited

U.S. PATENT DOCUMENTS

| | | |
|---|---|---|
| 11,012,224 B2 | 5/2021 | Ekpenyong et al. |
| 11,063,622 B2 | 7/2021 | Roe et al. |
| 11,082,950 B2 | 8/2021 | Li et al. |
| 11,139,905 B2 | 10/2021 | Chen et al. |
| 11,147,053 B2 | 10/2021 | Chen et al. |
| 11,159,298 B2 | 10/2021 | Kim et al. |
| 11,171,557 B2 | 11/2021 | Zong et al. |
| 11,177,919 B2 | 11/2021 | Ekpenyong et al. |
| 11,196,449 B2 | 12/2021 | Roe et al. |
| 11,239,971 B2 | 2/2022 | Chen et al. |
| 2004/0121730 A1 | 6/2004 | Kadous |
| 2006/0203794 A1 | 9/2006 | Sampath |
| 2007/0041457 A1 | 2/2007 | Kadous |
| 2007/0071147 A1 | 3/2007 | Sampath |
| 2007/0165738 A1 | 7/2007 | Barriac |
| 2008/0025241 A1 | 1/2008 | Bhushan |
| 2008/0112495 A1 | 5/2008 | Gore |
| 2009/0271686 A1 | 10/2009 | Jiang et al. |
| 2010/0003931 A1 | 1/2010 | Krishnan |
| 2010/0067422 A1 | 3/2010 | Kadous |
| 2010/0093279 A1 | 4/2010 | Linsky et al. |
| 2010/0232338 A1 | 9/2010 | Krishnamoorthi |
| 2010/0251069 A1 | 9/2010 | Sun et al. |
| 2011/0007680 A1 | 1/2011 | Kadous |
| 2011/0007688 A1 | 1/2011 | Veeravalli |
| 2011/0243079 A1 | 10/2011 | Chen et al. |
| 2011/0249603 A1 | 10/2011 | Rick et al. |
| 2012/0063321 A1 | 3/2012 | Chandrasekhar et al. |
| 2012/0077532 A1 | 3/2012 | Kadous |
| 2012/0113906 A1 | 5/2012 | Kadous |
| 2012/0127923 A1 | 5/2012 | Zhao |
| 2012/0140798 A1 | 6/2012 | Kadous |
| 2012/0213303 A1 | 8/2012 | Kadous |
| 2012/0220286 A1 | 8/2012 | Chen et al. |
| 2014/0036859 A1 | 2/2014 | Ekpenyong et al. |
| 2014/0071894 A1 | 3/2014 | Kairouz |
| 2014/0079155 A1 | 3/2014 | Wang |
| 2014/0126491 A1 | 5/2014 | Ekpenyong et al. |
| 2014/0192740 A1 | 7/2014 | Ekpenyong et al. |
| 2014/0219117 A1 | 8/2014 | Meshkati |
| 2014/0219243 A1 | 8/2014 | Meshkati |
| 2014/0273884 A1 | 9/2014 | Mantravadi |
| 2015/0063150 A1 | 3/2015 | Sadek |
| 2015/0063151 A1 | 3/2015 | Sadek |
| 2015/0063323 A1 | 3/2015 | Sadek |
| 2015/0070323 A1 | 3/2015 | Hong |
| 2015/0085686 A1 | 3/2015 | Chande |
| 2015/0139015 A1 | 5/2015 | Kadous |
| 2015/0163823 A1 | 6/2015 | Sadek |
| 2015/0282077 A1 | 10/2015 | Yavuz |
| 2015/0319702 A1 | 11/2015 | Patel |
| 2015/0350919 A1 | 12/2015 | Patel |
| 2016/0036512 A1 | 2/2016 | Rick et al. |
| 2016/0088625 A1 | 3/2016 | Kadous |
| 2016/0095039 A1 | 3/2016 | Valliappan |
| 2016/0095040 A1 | 3/2016 | Valliappan |
| 2016/0095077 A1 | 3/2016 | Kwak et al. |
| 2016/0128045 A1 | 5/2016 | Yazdi et al. |
| 2016/0128130 A1 | 5/2016 | Sadek |
| 2016/0192388 A1 | 6/2016 | Ekpenyong et al. |
| 2016/0270046 A1 | 9/2016 | Lin et al. |
| 2016/0295557 A1 | 10/2016 | Yazdi et al. |
| 2016/0352481 A1 | 12/2016 | Jiang et al. |
| 2016/0353482 A1 | 12/2016 | Valliappan |
| 2017/0141798 A1 | 5/2017 | Kudekar et al. |
| 2017/0142705 A1 | 5/2017 | Chendamarai Kannan |
| 2017/0149543 A1 | 5/2017 | Ang et al. |
| 2017/0150486 A1 | 5/2017 | Ang et al. |
| 2017/0171855 A1 | 6/2017 | Sundararajan et al. |
| 2017/0171879 A1 | 6/2017 | Jiang et al. |
| 2017/0207884 A1 | 7/2017 | Jiang et al. |
| 2017/0222771 A1 | 8/2017 | Chendamarai Kannan |
| 2017/0272224 A1 | 9/2017 | Ang et al. |
| 2017/0311346 A1 | 10/2017 | Chendamarai Kannan |
| 2017/0318563 A1 | 11/2017 | Yang et al. |
| 2017/0332288 A1 | 11/2017 | Sadek |
| 2017/0338996 A1 | 11/2017 | Sankar et al. |
| 2017/0359146 A1 | 12/2017 | Yang et al. |
| 2017/0359714 A1 | 12/2017 | Gupta et al. |
| 2018/0019766 A1 | 1/2018 | Yang et al. |
| 2018/0026740 A1 | 1/2018 | Chen et al. |
| 2018/0026764 A1 | 1/2018 | Namgoong et al. |
| 2018/0035423 A1 | 2/2018 | Wang |
| 2018/0035455 A1 | 2/2018 | Xu |
| 2018/0042030 A1 | 2/2018 | Xu |
| 2018/0049097 A1 | 2/2018 | Chen |
| 2018/0054348 A1 | 2/2018 | Luo |
| 2018/0054780 A1 | 2/2018 | Radulescu |
| 2018/0062810 A1 | 3/2018 | Vitthaladevuni |
| 2018/0083824 A1 | 3/2018 | Yang |
| 2018/0091373 A1 | 3/2018 | Manolakos |
| 2018/0092002 A1 | 3/2018 | Manolakos |
| 2018/0092081 A1 | 3/2018 | Chen |
| 2018/0097534 A1 | 4/2018 | Manolakos |
| 2018/0098293 A1 | 4/2018 | Jiang |
| 2018/0098307 A1 | 4/2018 | Yang |
| 2018/0098316 A1 | 4/2018 | Wang |
| 2018/0103428 A1 | 4/2018 | Jiang |
| 2018/0103485 A1 | 4/2018 | Jiang |
| 2018/0109406 A1 | 4/2018 | Wang |
| 2018/0109957 A1 | 4/2018 | Fan |
| 2018/0110048 A1 | 4/2018 | Ang |
| 2018/0124753 A1 | 5/2018 | Sun |
| 2018/0124777 A1 | 5/2018 | Yerramalli |
| 2018/0124789 A1 | 5/2018 | Yerramalli |
| 2018/0132223 A1 | 5/2018 | Sankar |
| 2018/0139618 A1 | 5/2018 | Yerramalli |
| 2018/0139758 A1 | 5/2018 | Sankar |
| 2018/0139782 A1 | 5/2018 | Sadek |
| 2018/0160328 A1 | 6/2018 | Chendamarai Kannan |
| 2018/0160389 A1 | 6/2018 | Yerramalli |
| 2018/0167848 A1 | 6/2018 | Lei |
| 2018/0176922 A1 | 6/2018 | Li |
| 2018/0176946 A1 | 6/2018 | Sun |
| 2018/0191470 A1 | 7/2018 | Manolakos |
| 2018/0198560 A1 | 7/2018 | Jiang |
| 2018/0220428 A1 | 8/2018 | Sun |
| 2018/0227011 A1 | 8/2018 | Yerramalli |
| 2018/0227771 A1 | 8/2018 | Malik |
| 2018/0227797 A1 | 8/2018 | Liu |
| 2018/0227936 A1 | 8/2018 | Yerramalli |
| 2018/0227944 A1 | 8/2018 | Yerramalli |
| 2018/0234880 A1 | 8/2018 | Jiang |
| 2018/0234881 A1 | 8/2018 | Hosseini |
| 2018/0234968 A1 | 8/2018 | Sun |
| 2018/0234993 A1 | 8/2018 | Hosseini |
| 2018/0241494 A1 | 8/2018 | Chendamarai Kannan |
| 2018/0242348 A1 | 8/2018 | Chendamarai Kannan |
| 2018/0249486 A1 | 8/2018 | Hosseini |
| 2018/0249496 A1 | 8/2018 | Radulescu |
| 2018/0255584 A1 | 9/2018 | Sun |
| 2018/0262311 A1 | 9/2018 | Wang |
| 2018/0262317 A1 | 9/2018 | Jiang |
| 2018/0269898 A1 | 9/2018 | Sun |
| 2018/0270022 A1 | 9/2018 | Sun |
| 2018/0270023 A1 | 9/2018 | Jiang |
| 2018/0270816 A1 | 9/2018 | Li |
| 2018/0279134 A1 | 9/2018 | Malik |
| 2018/0279292 A1 | 9/2018 | Luo |
| 2018/0279298 A1 | 9/2018 | Wang |
| 2018/0287744 A1 | 10/2018 | Sundararajan |
| 2018/0287745 A1 | 10/2018 | Sun |
| 2018/0287840 A1 | 10/2018 | Akkarakaran |
| 2018/0287870 A1 | 10/2018 | Yerramalli |
| 2018/0288747 A1 | 10/2018 | Sun |
| 2018/0288749 A1 | 10/2018 | Sun |
| 2018/0302186 A1 | 10/2018 | Reddy |
| 2018/0310262 A1 | 10/2018 | Ly |
| 2018/0310341 A1 | 10/2018 | Yerramalli |
| 2018/0323943 A1 | 11/2018 | Jiang |
| 2018/0324676 A1 | 11/2018 | Huang |
| 2018/0324713 A1 | 11/2018 | Yoo |
| 2018/0331693 A1 | 11/2018 | Lou |
| 2018/0343676 A1 | 11/2018 | Yerramalli |

(56) References Cited

U.S. PATENT DOCUMENTS

| | | |
|---|---|---|
| 2018/0352563 A1 | 12/2018 | Liu |
| 2018/0367245 A1 | 12/2018 | Soriaga |
| 2018/0367362 A1 | 12/2018 | Sun |
| 2018/0368089 A1 | 12/2018 | Yerramalli |
| 2018/0375612 A1 | 12/2018 | Sarkis |
| 2018/0375629 A1 | 12/2018 | Lee |
| 2019/0007946 A1 | 1/2019 | Yerramalli |
| 2019/0007956 A1 | 1/2019 | Jiang |
| 2019/0014481 A1 | 1/2019 | Yerramalli |
| 2019/0014507 A1 | 1/2019 | Zhang |
| 2019/0014589 A1 | 1/2019 | Yerramalli |
| 2019/0020424 A1 | 1/2019 | Yerramalli |
| 2019/0020461 A1 | 1/2019 | Yerramalli |
| 2019/0020522 A1 | 1/2019 | Sun |
| 2019/0020528 A1 | 1/2019 | Lei |
| 2019/0020529 A1 | 1/2019 | Lei |
| 2019/0021080 A1 | 1/2019 | Lei |
| 2019/0021097 A1 | 1/2019 | Li |
| 2019/0028119 A1 | 1/2019 | Yang |
| 2019/0028999 A1 | 1/2019 | Yerramalli |
| 2019/0029019 A1 | 1/2019 | Zhang |
| 2019/0036663 A1 | 1/2019 | Azarian Yazdi |
| 2019/0037427 A1 | 1/2019 | Yerramalli |
| 2019/0037481 A1 | 1/2019 | Zhang |
| 2019/0037482 A1 | 1/2019 | Damnjanovic |
| 2019/0037603 A1 | 1/2019 | Damnjanovic |
| 2019/0044540 A1 | 2/2019 | Jiang |
| 2019/0044777 A1 | 2/2019 | Manolakos |
| 2019/0052400 A1 | 2/2019 | Soriaga |
| 2019/0053255 A1 | 2/2019 | Li |
| 2019/0053266 A1 | 2/2019 | Jiang |
| 2019/0053269 A1 | 2/2019 | Lei |
| 2019/0058553 A1 | 2/2019 | Sun |
| 2019/0059001 A1 | 2/2019 | Yerramalli |
| 2019/0059102 A1 | 2/2019 | Yerramalli |
| 2019/0068335 A1 | 2/2019 | Li |
| 2019/0068345 A1 | 2/2019 | Chen |
| 2019/0069325 A1 | 2/2019 | Yerramalli |
| 2019/0075597 A1 | 3/2019 | Yerramalli |
| 2019/0081768 A1 | 3/2019 | Zhang |
| 2019/0082333 A1 | 3/2019 | Malik |
| 2019/0089489 A1 | 3/2019 | Li |
| 2019/0090178 A1 | 3/2019 | Liu |
| 2019/0090256 A1 | 3/2019 | Liu |
| 2019/0090273 A1 | 3/2019 | Yoo |
| 2019/0098654 A1 | 3/2019 | Li |
| 2019/0098663 A1 | 3/2019 | Zhang |
| 2019/0103928 A1 | 4/2019 | Nagaraja |
| 2019/0104416 A1 | 4/2019 | Yerramalli |
| 2019/0104514 A1 | 4/2019 | Chendamarai Kannan |
| 2019/0104542 A1 | 4/2019 | Chendamarai Kannan |
| 2019/0104546 A1 | 4/2019 | Chendamarai Kannan |
| 2019/0110208 A1 | 4/2019 | Xue |
| 2019/0110254 A1 | 4/2019 | Yerramalli |
| 2019/0110302 A1 | 4/2019 | Zhang |
| 2019/0110317 A1 | 4/2019 | Zhang |
| 2019/0116585 A1 | 4/2019 | Chakraborty |
| 2019/0116599 A1 | 4/2019 | Xue |
| 2019/0123779 A1 | 4/2019 | Ekpenyong et al. |
| 2019/0124595 A1 | 4/2019 | Lei |
| 2019/0124613 A1 | 4/2019 | Liu |
| 2019/0124630 A1 | 4/2019 | Ji |
| 2019/0124663 A1 | 4/2019 | Liu |
| 2019/0124694 A1 | 4/2019 | Chendamarai Kannan |
| 2019/0124700 A1 | 4/2019 | Ji |
| 2019/0132817 A1 | 5/2019 | Liu |
| 2019/0141707 A1 | 5/2019 | Yerramalli |
| 2019/0141723 A1 | 5/2019 | Zhang |
| 2019/0141734 A1 | 5/2019 | Lei |
| 2019/0141744 A1 | 5/2019 | Naghshvar |
| 2019/0141783 A1 | 5/2019 | Malik |
| 2019/0149190 A1 | 5/2019 | Liu |
| 2019/0149364 A1 | 5/2019 | Sundararajan |
| 2019/0150088 A1 | 5/2019 | Sun |
| 2019/0150120 A1 | 5/2019 | Sarkis |
| 2019/0150179 A1 | 5/2019 | Soriaga |
| 2019/0150198 A1 | 5/2019 | Sun |
| 2019/0158221 A1 | 5/2019 | Sarkis |
| 2019/0158227 A1 | 5/2019 | Gupta |
| 2019/0158240 A1 | 5/2019 | Li |
| 2019/0158251 A1 | 5/2019 | Park |
| 2019/0158252 A1 | 5/2019 | Li |
| 2019/0158333 A1 | 5/2019 | Zhang |
| 2019/0159202 A1 | 5/2019 | Lee |
| 2019/0159280 A1 | 5/2019 | Chakraborty |
| 2019/0165902 A1 | 5/2019 | Li |
| 2019/0165982 A1 | 5/2019 | Gaal |
| 2019/0166589 A1 | 5/2019 | Yang |
| 2019/0166621 A1 | 5/2019 | Yerramalli |
| 2019/0166625 A1 | 5/2019 | Nam |
| 2019/0173521 A1 | 6/2019 | Liu |
| 2019/0173611 A1 | 6/2019 | Liu |
| 2019/0173619 A1 | 6/2019 | Li |
| 2019/0174518 A1 | 6/2019 | Jiang |
| 2019/0174542 A1 | 6/2019 | Lei |
| 2019/0181979 A1 | 6/2019 | Wang |
| 2019/0181995 A1 | 6/2019 | Liu |
| 2019/0182826 A1 | 6/2019 | Yerramalli |
| 2019/0182845 A1 | 6/2019 | Xue |
| 2019/0190668 A1 | 6/2019 | Lei |
| 2019/0190681 A1 | 6/2019 | Li |
| 2019/0191391 A1 | 6/2019 | Ekpenyong et al. |
| 2019/0207723 A1 | 7/2019 | Lei |
| 2019/0222342 A1 | 7/2019 | Park |
| 2019/0222343 A1 | 7/2019 | Park |
| 2019/0223184 A1 | 7/2019 | Sarkis |
| 2019/0223215 A1 | 7/2019 | Tian |
| 2019/0229788 A1 | 7/2019 | Zhang |
| 2019/0230697 A1 | 7/2019 | Yang |
| 2019/0238177 A1 | 8/2019 | Liu |
| 2019/0238196 A1 | 8/2019 | Lei |
| 2019/0238219 A1 | 8/2019 | Liu |
| 2019/0238284 A1 | 8/2019 | Liu |
| 2019/0239202 A1 | 8/2019 | Bhattad |
| 2019/0245560 A1 | 8/2019 | Yang |
| 2019/0245658 A1 | 8/2019 | Yang |
| 2019/0246410 A1 | 8/2019 | Zhang |
| 2019/0246419 A1 | 8/2019 | Sun |
| 2019/0246425 A1 | 8/2019 | Zhang |
| 2019/0253219 A1 | 8/2019 | Fan |
| 2019/0253232 A1 | 8/2019 | Park |
| 2019/0254081 A1 | 8/2019 | Li |
| 2019/0260451 A1 | 8/2019 | Sarkis |
| 2019/0261323 A1 | 8/2019 | Lee |
| 2019/0261354 A1 | 8/2019 | Fakoorian |
| 2019/0268059 A1 | 8/2019 | Yang |
| 2019/0268127 A1 | 8/2019 | Hosseini |
| 2019/0268129 A1 | 8/2019 | Lin |
| 2019/0268206 A1 | 8/2019 | Yang |
| 2019/0268907 A1 | 8/2019 | Bhattad |
| 2019/0268923 A1 | 8/2019 | Sundararajan |
| 2019/0268932 A1 | 8/2019 | Sundararajan |
| 2019/0268933 A1 | 8/2019 | Sun |
| 2019/0274162 A1 | 9/2019 | Zhang |
| 2019/0280829 A1 | 9/2019 | Wei |
| 2019/0280836 A1 | 9/2019 | Bhattad |
| 2019/0288789 A1 | 9/2019 | Li |
| 2019/0288800 A1 | 9/2019 | Hosseini |
| 2019/0289602 A1 | 9/2019 | Mukkavilli |
| 2019/0289629 A1 | 9/2019 | Luo |
| 2019/0296809 A1 | 9/2019 | Li |
| 2019/0296882 A1 | 9/2019 | Li |
| 2019/0305882 A1 | 10/2019 | Wang |
| 2019/0305911 A1 | 10/2019 | Sarkis |
| 2019/0306878 A1 | 10/2019 | Zhang |
| 2019/0306881 A1 | 10/2019 | Fakoorian |
| 2019/0312671 A1 | 10/2019 | Lin |
| 2019/0312763 A1 | 10/2019 | Lei |
| 2019/0313259 A1 | 10/2019 | Bendlin et al. |
| 2019/0313260 A1 | 10/2019 | Zhang |
| 2019/0313385 A1 | 10/2019 | Yang |
| 2019/0313419 A1 | 10/2019 | Fakoorian |
| 2019/0313430 A1 | 10/2019 | Manolakos |
| 2019/0319732 A1 | 10/2019 | Manolakos |

(56) References Cited

U.S. PATENT DOCUMENTS

| | | |
|---|---|---|
| 2019/0319767 A1 | 10/2019 | Sun |
| 2019/0320393 A1 | 10/2019 | Hosseini |
| 2019/0320402 A1 | 10/2019 | Ji |
| 2019/0320420 A1 | 10/2019 | Zhang |
| 2019/0320424 A1 | 10/2019 | Yerramalli |
| 2019/0320452 A1 | 10/2019 | Zhang |
| 2019/0320458 A1 | 10/2019 | Hosseini |
| 2019/0327047 A1 | 10/2019 | Liu |
| 2019/0327062 A1 | 10/2019 | Jiang |
| 2019/0334577 A1 | 10/2019 | Damnjanovic |
| 2019/0334666 A1 | 10/2019 | Damnjanovic |
| 2019/0335337 A1 | 10/2019 | Damnjanovic |
| 2019/0335447 A1 | 10/2019 | Sarkis |
| 2019/0335456 A1 | 10/2019 | Yerramalli |
| 2019/0335480 A1 | 10/2019 | Sun |
| 2019/0335481 A1 | 10/2019 | Jiang |
| 2019/0335490 A1 | 10/2019 | Zeng |
| 2019/0335500 A1 | 10/2019 | Zhang |
| 2019/0335504 A1 | 10/2019 | Chakraborty |
| 2019/0342035 A1 | 11/2019 | Zhang |
| 2019/0342045 A1 | 11/2019 | Radulescu |
| 2019/0342836 A1 | 11/2019 | Ang |
| 2019/0349010 A1 | 11/2019 | Wu |
| 2019/0349176 A1 | 11/2019 | Li |
| 2019/0349221 A1 | 11/2019 | Jiang |
| 2019/0349897 A1 | 11/2019 | Hosseini |
| 2019/0349900 A1 | 11/2019 | Sarkis |
| 2019/0349941 A1 | 11/2019 | Yang |
| 2019/0349969 A1 | 11/2019 | Chakraborty |
| 2019/0349973 A1 | 11/2019 | Yang |
| 2019/0349974 A1 | 11/2019 | Sundararajan |
| 2019/0349992 A1 | 11/2019 | Zhang |
| 2019/0349998 A1 | 11/2019 | Bhattad |
| 2019/0356441 A1 | 11/2019 | Jiang |
| 2019/0356455 A1 | 11/2019 | Yang |
| 2019/0357150 A1 | 11/2019 | Wang |
| 2019/0357252 A1 | 11/2019 | Sun et al. |
| 2019/0357255 A1 | 11/2019 | Sun et al. |
| 2019/0363773 A1 | 11/2019 | Yerramalli et al. |
| 2019/0363853 A1 | 11/2019 | Soriaga |
| 2019/0364468 A1 | 11/2019 | Yerramalli et al. |
| 2019/0364579 A1 | 11/2019 | Zhang et al. |
| 2019/0372605 A1 | 12/2019 | Li |
| 2019/0372608 A1 | 12/2019 | Wei |
| 2019/0372712 A1 | 12/2019 | Yang |
| 2019/0373571 A1 | 12/2019 | Damnjanovic et al. |
| 2019/0373629 A1 | 12/2019 | Mukkavilli |
| 2019/0373640 A1 | 12/2019 | Sun et al. |
| 2019/0379485 A1 | 12/2019 | Jiang |
| 2019/0379518 A1 | 12/2019 | Yang |
| 2019/0379561 A1 | 12/2019 | Zhang et al. |
| 2019/0380052 A1 | 12/2019 | Yang |
| 2019/0380127 A1 | 12/2019 | Wang |
| 2019/0380147 A1 | 12/2019 | Zhang et al. |
| 2019/0386737 A1 | 12/2019 | Liu et al. |
| 2019/0387532 A1 | 12/2019 | Liu et al. |
| 2019/0393986 A1 | 12/2019 | Wang |
| 2019/0394008 A1 | 12/2019 | Chen et al. |
| 2019/0394772 A1 | 12/2019 | Li |
| 2019/0394790 A1 | 12/2019 | Damnjanovic et al. |
| 2020/0007160 A1 | 1/2020 | Li |
| 2020/0007294 A1 | 1/2020 | Yang |
| 2020/0007302 A1 | 1/2020 | Manolakos |
| 2020/0008107 A1 | 1/2020 | Zhang et al. |
| 2020/0008131 A1 | 1/2020 | Chakraborty et al. |
| 2020/0008235 A1 | 1/2020 | Sarkis |
| 2020/0008239 A1 | 1/2020 | Li |
| 2020/0014499 A1 | 1/2020 | Sun |
| 2020/0015268 A1 | 1/2020 | Zhang et al. |
| 2020/0021423 A1 | 1/2020 | Liu et al. |
| 2020/0022029 A1 | 1/2020 | Sadek et al. |
| 2020/0022136 A1 | 1/2020 | Wang |
| 2020/0029203 A1 | 1/2020 | Ekpenyong et al. |
| 2020/0029221 A1 | 1/2020 | Xue et al. |
| 2020/0029335 A1 | 1/2020 | Yang |
| 2020/0036476 A1 | 1/2020 | Yang |
| 2020/0036477 A1 | 1/2020 | Xu |
| 2020/0037235 A1 | 1/2020 | Ly |
| 2020/0037319 A1 | 1/2020 | Li |
| 2020/0037336 A1 | 1/2020 | Sun et al. |
| 2020/0037338 A1 | 1/2020 | Li |
| 2020/0037347 A1 | 1/2020 | Yang |
| 2020/0037352 A1 | 1/2020 | Yang |
| 2020/0044778 A1 | 2/2020 | Park |
| 2020/0044784 A1 | 2/2020 | Yang |
| 2020/0044793 A1 | 2/2020 | Sundararajan |
| 2020/0045556 A1 | 2/2020 | Xue |
| 2020/0045744 A1 | 2/2020 | Sun |
| 2020/0052717 A1 | 2/2020 | Wang |
| 2020/0052750 A1 | 2/2020 | Manolakos |
| 2020/0052831 A1 | 2/2020 | Yang |
| 2020/0052870 A1 | 2/2020 | Yerramalli |
| 2020/0053599 A1 | 2/2020 | Damnjanovic |
| 2020/0053658 A1 | 2/2020 | Sundararajan |
| 2020/0053739 A1 | 2/2020 | Xue |
| 2020/0053744 A1 | 2/2020 | Hosseini |
| 2020/0053801 A1 | 2/2020 | Hosseini |
| 2020/0058989 A1 | 2/2020 | Eslami et al. |
| 2020/0059854 A1 | 2/2020 | Li et al. |
| 2020/0059926 A1 | 2/2020 | Jiang |
| 2020/0067574 A1 | 2/2020 | Yang |
| 2020/0067748 A1 | 2/2020 | Zhang |
| 2020/0068435 A1 | 2/2020 | Zhang |
| 2020/0068495 A1 | 2/2020 | Yang |
| 2020/0068528 A1 | 2/2020 | Abraham |
| 2020/0076563 A1 | 3/2020 | Yang |
| 2020/0083982 A1 | 3/2020 | Jiang |
| 2020/0083987 A1 | 3/2020 | Xu |
| 2020/0084759 A1 | 3/2020 | Liu |
| 2020/0084778 A1 | 3/2020 | Wang |
| 2020/0084784 A1 | 3/2020 | Jiang |
| 2020/0092041 A1 | 3/2020 | Sankar |
| 2020/0092818 A1 | 3/2020 | Jiang |
| 2020/0092909 A1 | 3/2020 | Ekpenyong |
| 2020/0092936 A1 | 3/2020 | Malik |
| 2020/0099469 A1 | 3/2020 | Jiang |
| 2020/0099472 A1 | 3/2020 | Wang |
| 2020/0099560 A1 | 3/2020 | Li |
| 2020/0100116 A1 | 3/2020 | Chakraborty |
| 2020/0100226 A1 | 3/2020 | Hosseini |
| 2020/0100247 A1 | 3/2020 | Zhang |
| 2020/0100257 A1 | 3/2020 | Yang |
| 2020/0107335 A1 | 4/2020 | Xue |
| 2020/0107336 A1 | 4/2020 | Yang |
| 2020/0107360 A1 | 4/2020 | Xue |
| 2020/0107364 A1 | 4/2020 | Xue |
| 2020/0112391 A1 | 4/2020 | Yang |
| 2020/0112394 A1 | 4/2020 | Mukkavilli |
| 2020/0112396 A1 | 4/2020 | Jiang |
| 2020/0112421 A1 | 4/2020 | Ang |
| 2020/0112964 A1 | 4/2020 | Yang |
| 2020/0112983 A1 | 4/2020 | Hosseini |
| 2020/0119446 A1 | 4/2020 | Shamblin et al. |
| 2020/0176893 A1 | 6/2020 | Roe et al. |
| 2020/0213052 A1 | 7/2020 | Li et al. |
| 2020/0220681 A1* | 7/2020 | Yang .................. H04L 5/0048 |
| 2020/0295980 A1 | 9/2020 | Bertrand et al. |
| 2020/0314691 A1 | 10/2020 | Chen et al. |
| 2020/0322202 A1 | 10/2020 | Hadani et al. |
| 2020/0359228 A1 | 11/2020 | Sirotkin et al. |
| 2020/0396443 A1 | 12/2020 | Roe et al. |
| 2021/0006149 A1 | 1/2021 | Zong et al. |
| 2021/0184821 A1 | 6/2021 | Chen et al. |
| 2021/0190895 A1 | 6/2021 | Pajona et al. |
| 2021/0200832 A1 | 7/2021 | Birch et al. |
| 2021/0211037 A1 | 7/2021 | Tian et al. |
| 2021/0258814 A1 | 8/2021 | Chandrasekhar et al. |
| 2021/0266131 A1 | 8/2021 | Ekpenyong |
| 2021/0273552 A1 | 9/2021 | Tian et al. |
| 2021/0273770 A1 | 9/2021 | Ekpenyong et al. |
| 2021/0296765 A1 | 9/2021 | Eslami et al. |
| 2021/0344370 A1 | 11/2021 | Roe et al. |
| 2021/0385035 A1 | 12/2021 | Ghozlan et al. |
| 2021/0385868 A1 | 12/2021 | Ying et al. |

(56) References Cited

U.S. PATENT DOCUMENTS

| | | |
|---|---|---|
| 2022/0006552 A1 | 1/2022 | Ghozlan et al. |
| 2022/0015093 A1 | 1/2022 | Ying et al. |
| 2022/0029725 A1 | 1/2022 | Chen et al. |
| 2022/0030610 A1 | 1/2022 | Chen et al. |
| 2022/0038164 A1 | 2/2022 | Wei et al. |
| 2022/0039032 A1 | 2/2022 | Wei et al. |
| 2022/0123977 A1 | 4/2022 | Jiang et al. |

OTHER PUBLICATIONS

Written Opinion for International Application No. PCT/US2021/071881, dated Jan. 27, 2022.

* cited by examiner

REFERENCE SIGNAL FOR WIRELESS COMMUNICATIONS

CROSS REFERENCE TO RELATED APPLICATIONS

This application claims the benefit of priority of U.S. Provisional Patent Application No. 63/093,449, filed Oct. 19, 2020 and titled "REFERENCE SIGNAL FOR WIRELESS COMMUNICATION SYSTEMS," the disclosure of which is hereby incorporated by reference herein in its entirety and for all purposes. The present disclosure relates to U.S. patent application Ser. No. 17/451,209, filed on even date herewith and titled "REFERENCE SIGNAL FOR WIRELESS COMMUNICATION SYSTEMS," the disclosure of which is hereby incorporated by reference herein in its entirety and for all purposes.

BACKGROUND

Technical Field

Embodiments of this disclosure relate to reference signals for wireless communication systems.

Description of Related Technology

In a wireless communication system, it can be desirable to have an accurate estimate of communication channels between devices that wirelessly communicate with each other. When reciprocal channel estimation is used for a time division duplex (TDD) system, calibration of an uplink and downlink channel difference is typically performed. Certain communication standards include reference signals that can be used to estimate a communication channel. In certain communication systems, downlink frames and uplink frames are not aligned. This can present technical challenges in channel estimation and/or calibration. As different parts of a communication system process reference signals, it can be more difficult to align uplink frames and downlink frames.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a method of transmitting reference symbols. The method includes generating a first reference symbol comprising a symbol and a cyclically shifted portion of the symbol. The cyclically shifted portion has a cyclic shift length. The method includes generating a second reference symbol, where the second reference symbol comprises a cyclically shifted version of the first reference symbol that is cyclically shifted relative to the first reference symbol by the cyclic shift length. The method also includes transmitting, via at least one antenna, the first and second reference symbols consecutively.

The cyclically shifted portion can be a cyclic prefix with the symbol following the cyclic prefix in the first reference symbol.

A frame offset between uplink symbols and downlink symbols can be greater than the cyclic shift length.

Generating the first reference symbol can include adding the cyclically shifted portion in a time domain. Generating the first reference symbol can include applying weighted overlap and add roll off. The first reference symbol can be generated based on at least one of Gold sequence or Zadoff-Chu sequence in certain applications. Generating the second reference symbol can include applying a frequency domain phase ramp to at least the symbol of the first reference symbol.

The method can include applying phase ramping to the first and second reference symbols to pre-compensate for at least a frame offset between uplink symbols and downlink symbols. Applying phase ramping can also pre-compensate for an additional offset. Applying phase ramping can pre-compensate for a New Radio standard specified phase rotation.

Transmitting can include a time domain duplex (TDD) transmission. The first and second reference symbols can be orthogonal frequency division multiplexing symbols. The first and second reference symbols can include at least one of Discrete Fourier Transform-spread Orthogonal Frequency Division Multiple Access symbols, Interleaved-Frequency Division Multiple Access symbols, or other time domain waveform symbols.

Another aspect of this disclosure is a system for transmitting reference symbols. The system includes at least one an antenna, a base band unit, and a radio frequency processing unit in communication with the base band unit. The base band unit and the radio frequency processing unit are together configured to generate a first reference symbol, generate a second reference symbol, and cause the first and second reference symbols to be consecutively transmitted from the at least one antenna. The first reference symbol includes a symbol and a cyclically shifted portion of the symbol. The cyclically shifted portion has a cyclic shift length. The second reference symbol includes a cyclically shifted version of the first reference symbol that is cyclically shifted relative to the first reference symbol by the cyclic shift length.

The first and second reference symbols can be transmitted as part of a time domain duplex (TDD) transmission. A frame offset between uplink symbols and downlink symbols can be greater than the cyclic shift length.

The radio frequency processing unit can include a remote radio unit. The radio frequency processing unit can include fronthaul circuitry.

The radio frequency processing unit can be configured to perform an inverse Fast Fourier Transform on a frequency domain version of the symbol provided by the base band unit. The radio frequency processing unit can be configured to add the cyclically shifted portion to the first reference symbol.

The base band unit can include a phase ramping block configured to apply phase ramping to the symbol. The second reference symbol can be generated based on an output signal from the phase ramping block.

Another aspect of this disclosure is non-transitory, computer-readable storage comprising computer-executable instructions. The computer-executable instructions, when executed by a base band unit, cause a method to be performed. The method includes generating a first reference symbol comprising a symbol and a cyclically shifted portion of the symbol, the cyclically shifted portion having a cyclic shift length; generating a second reference symbol, wherein the second reference symbol comprises a cyclically shifted version of the first reference symbol that is cyclically shifted relative to the first reference symbol by the cyclic shift length; and transmitting, via at least one antenna, the first and second reference symbols consecutively.

Another aspect of this disclosure is a method of processing reference symbols. The method includes receiving a reference symbol from at least one antenna and processing the reference symbol. The reference symbol includes a portion of a first transmitted reference symbol and a portion of a second transmitted reference symbol. The first transmitted reference symbol includes a symbol and a cyclically shifted portion of the symbol having a cyclic shift length. The second transmitted reference symbol includes a cyclically shifted version of the first transmitted reference symbol that is cyclically shifted relative to the first transmitted reference symbol by the cyclic shift length.

Processing the reference symbol can include accounting for a frame offset between uplink symbols and downlink symbols. Processing the reference symbol can also include accounting for another timing offset between downlink transmission and uplink reception.

The reference symbol can be pre-compensated from a transmitter side.

The reference symbol can be generated based on a downlink Channel State Information Reference Signal sequence. A same Channel State Information Reference Signal sequence can be used for generating the reference symbol and for downlink Channel State Information processing.

The method can include generating at least one channel estimate based on the processing. The method can include generating antenna calibration coefficients based on the processing.

The processing can include applying a phase ramp in a frequency domain. The processing can include using a priori information to account for the frame offset and/or any other timing offset between uplink reception and downlink transmission. The processing can include removing time domain samples of the reference symbol corresponding to the cyclic shift length. The processing can include cyclically shifting samples in a time domain.

At least one remote radio unit can perform at least a portion of the processing. Fronthaul circuitry can perform at least a portion of the processing.

The frame offset can be greater than the cyclic shift length.

Receiving can include time domain duplex (TDD) reception. The first and second transmitted reference symbols are orthogonal frequency divisional multiplexing symbols.

Another aspect of this disclosure is a system for processing reference symbols. The system includes at least one antenna, a base band unit, and a radio frequency processing unit in communication with the base band unit. The base band unit and radio frequency processing unit are together configured to receive, from the at least one antenna, a reference symbol and process the reference symbol to account for (i) a frame offset between uplink symbols and downlink symbols and (ii) another timing offset between downlink transmission and uplink reception. The reference symbol includes a portion of a first transmitted reference symbol and a portion of a second transmitted reference symbol. The first transmitted reference symbol includes a symbol and a cyclically shifted portion of the symbol having a cyclic shift length. The second transmitted reference symbol includes a cyclically shifted version of the first reference symbol that is cyclically shifted relative to the first transmitted reference symbol by the cyclic shift length.

The radio frequency processing unit can be configured to remove time domain samples corresponding to the cyclic shift length from the reference symbol.

The base band unit can be configured to generate at least one channel estimate based on processing of the reference symbol.

Another aspect of this disclosure is non-transitory, computer-readable storage comprising computer-executable instructions. The computer-executable instructions, when executed by a base band unit, cause a method to be performed. The method includes receiving, from at least one antenna, a reference symbol comprising a portion of a first transmitted reference symbol and a portion of a second transmitted reference symbol, wherein the first transmitted reference symbol comprises a symbol and a cyclically shifted portion of the symbol having a cyclic shift length, and wherein the second transmitted reference symbol comprises a cyclically shifted version of the first transmitted reference symbol that is cyclically shifted relative to the first transmitted reference symbol by the cyclic shift length; and processing the reference symbol.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1A:
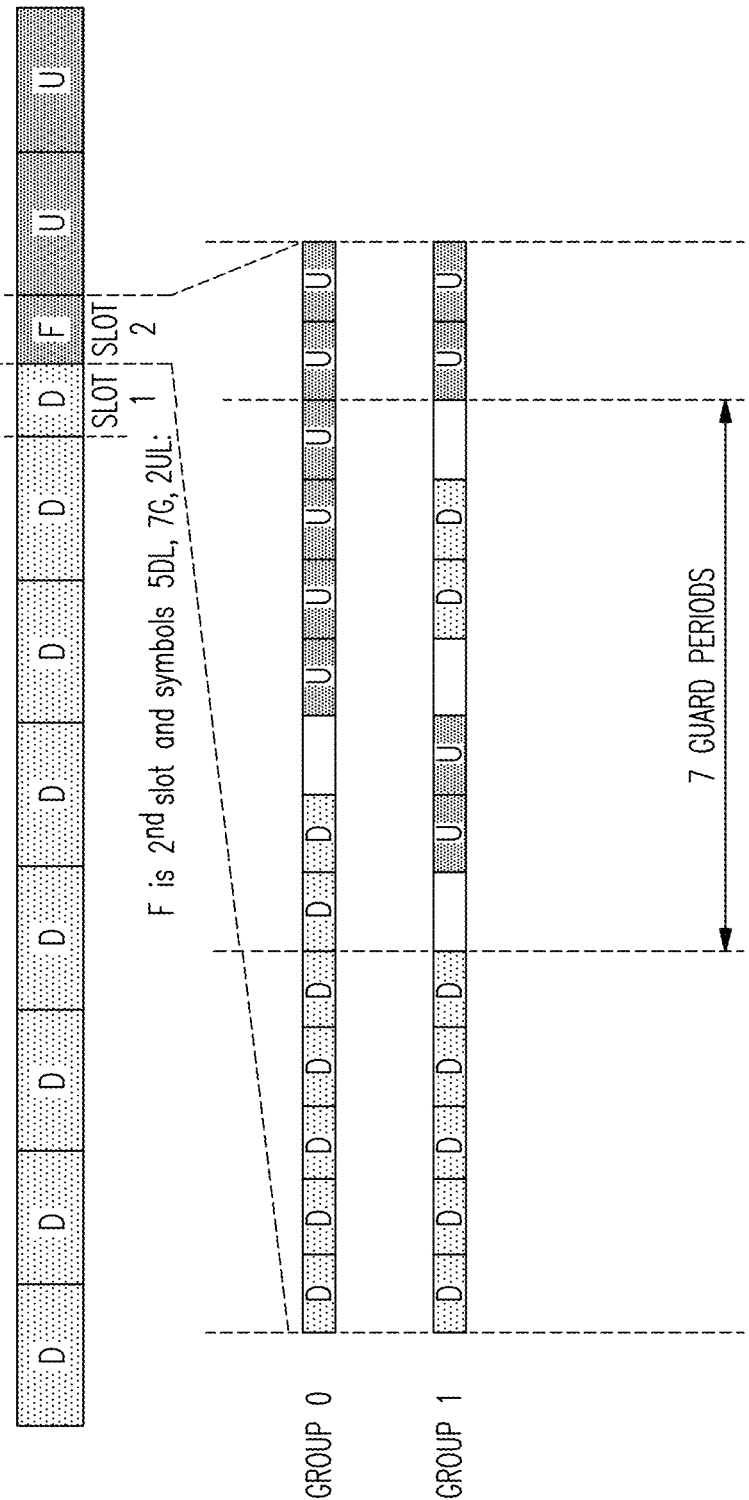
FIG. 1A is a timing diagram for example New Radio (NR) frames illustrating frame structure and calibration reference signal timing.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

In time division duplex (TDD) communication systems, a reference signal can be transmitted from an antenna of a first node to an antenna of a second node. In certain TDD systems, an uplink channel estimate can be used to estimate a downlink channel quality based on channel reciprocity. For estimating the downlink channel quality based on reciprocity, a calibration of uplink and downlink channel differences arising from transmit and receive circuitry can be performed. Channel reciprocity can be used for downlink transmit beamforming. Any suitable channel estimate and/or calibration data (e.g., a calibration coefficient) can be generated based on a received reference signal. It can be desirable for a plurality of different remote radio units (RRUs) and/or other network nodes to perform over the air calibration over time (e.g., periodically).

In a TDD frame structure, downlink frames and uplink frames are not aligned in a variety of applications. There is a frame offset between uplink frames and downlink frames in such applications. The frame offset can present challenges for calibration where a downlink (DL) transmitted waveform's symbol boundary is not aligned with an uplink (UL) receive signal symbol boundary.

Aspects of this disclosure relate to transmitting a reference signal comprising reference symbols and/or processing a received reference signal that can be used for calibration of UL/DL channels across all remote radio units (RRUs). A first reference symbol can include a symbol and a cyclically shifted portion of the symbol. A second reference symbol can be a cyclically shifted version of the first reference symbol that is cyclically shifted relative to the first reference symbol by a length of the cyclically shifted portion of the symbol. The first and second reference symbols can be wirelessly transmitted consecutively via at least one antenna. A received reference symbol can include part of the transmitted first reference symbol and part of the transmitted second reference symbol. This can occur due to the receiver window of the symbol landing in the middle of two transmitted symbols due to the UL/DL frame-offset. The received reference symbol can be processed to account for a frame offset between uplink and downlink frames and the length of the cyclically shifted portion of the symbol. Accordingly, the symbol can be recovered from the received reference symbol regardless of the frame offset. The symbol can be used to generate a channel estimate and/or other calibration data.

FIG. 1A is a timing diagram for example New Radio (NR) frames illustrating frame structure and calibration reference signal timing. The frame structure can be for Open Radio Access Network (ORAN) architectures with TDD coordinated multipoint (COMP) wireless communications. The ORAN architectures can be based on ORAN Option 7.x and/or Option 8, for example.

As shown in FIG. 1A, the NR frame structure can include 7 downlink (DL) slots, a special slot SSF, and 2 uplink (UL) slots. A third generation partnership project (3GPP) NR slot duration can be equivalent in terms of data scheduling to a 3GPP Long Term Evolution (LTE) subframe. The special slot SSF is between the DL slots and the UL slots. Each group of 7 DL slots, a special slot, and 2 UL slots can be 5 milliseconds (ms) long. Other durations are possible according to the TDD frame structure. Each group of 7 DL slots, a special slot, and 2 UL slots can be repeated.

The special slot SSF can include DL symbols, UL symbols, and flexible symbols that can be configured as DL, UL, or serve as a guard period between DL and UL. In FIG. 1A, the special slot SSF consists of a DL part and a flexible part. Calibration can occur within a flexible period in the special slot. In the illustrated example, the flexible period is 7 symbols long in the special slot.

Figure 1B:
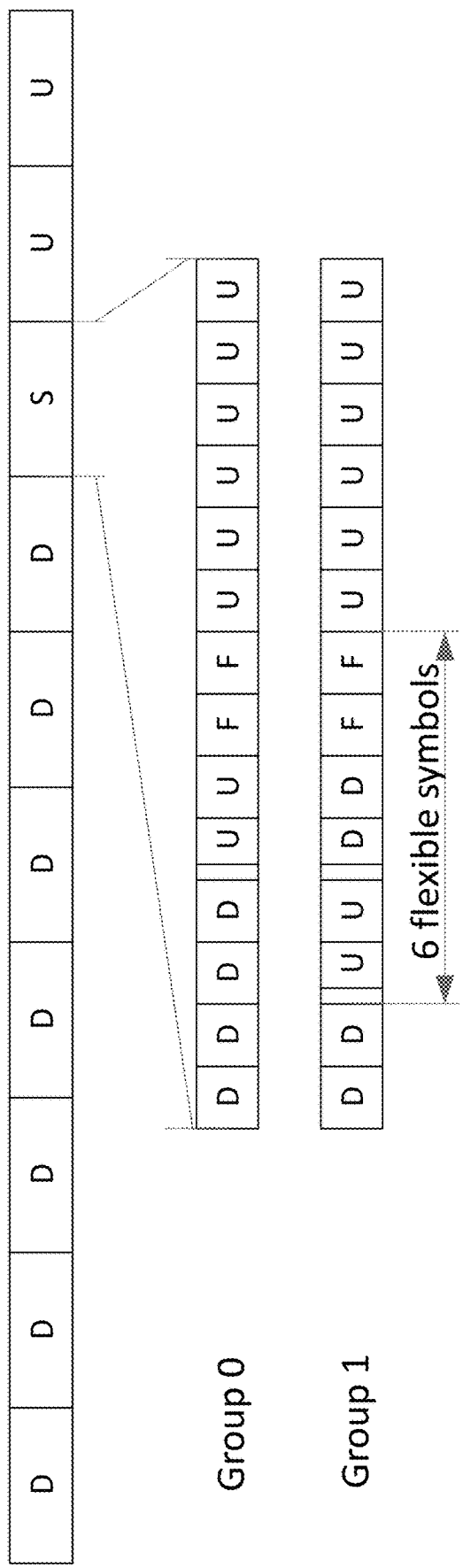
FIG. 1B is a timing diagram for another example of NR frames illustrating frame structure and calibration reference signal timing.

FIG. 1B is a timing diagram of another example of a NR frame structure illustrating frame structure and calibration reference signal timing. In the NR frame structure of FIG. 1B, the special slot S includes 2 DL symbols, 6 flexible symbols and 6 UL symbols. The two DL symbols can include Physical Downlink Control Channel (PDCCH) communications. Calibration can occur within the first 4 symbols of the flexible part of the special slot S. A first group of network antennas can transmit calibration reference symbols in the first two symbols of the flexible symbols, and a second group of network antennas can transmit calibration reference symbols in the next two symbols of the flexible symbols. Each of the two groups of network antennas can each receive a calibration reference symbol that includes parts of the two transmitted calibration reference symbols from the other group. The 6 UL symbols of the special slot can be used for receiving Sounding Reference Signal (SRS) communications from user equipments. If calibration is not performed in the special slot S, there are 4 symbols available for Physical Downlink Shared Channel (PDSCH) communications. In some instances, the UL portion of the special slot can be reduced to support a longer PDSCH.

In LTE or NR, the UL and DL symbols may not be fully aligned. Thus, the symbols for calibration reference signal transmission in multiple groups, e.g., groups of antennas G0 and G1 may not be aligned. Groups of antennas G0 and G1 can each be included in one or more remote radio units. Group G0 can transmit a reference signal (RS) measured by group G1 as channel estimate 0. Then group G1 can transmit a RS measured by group G0 as channel estimate 1. Examples of timing of group G0 and group G1 transmitting and receiving during a special slot are shown in FIGS. 1A and 1B. By comparing the difference of channel estimate 0 and channel estimate 1, a gNode B (gNB) can compute a calibration coefficient for each antenna. In an example, group G0 transmits in DL mode and group G1 receives in UL mode are not symbol aligned and vice versa. In ORAN architectures, time domain samples can be processed in fronthaul (FH) circuitry with Common Public Radio Interface (CPRI) and/or in remote radio units (RRUs) with enhanced CPRI (eCPRI). The migration of processing time domain samples in FH circuitry and/or one or more RRUs can make it even more difficult to align the transmit and receive time domain symbol boundary. For example, it can be more difficult to have knowledge of a timing offset and/or to align symbol boundaries passed to a FH and/or RRU side.

Aspects of this disclosure relate to a calibration reference signal waveform that makes the calibration process transparent to different RRU and/or FH implementations for processing time domain samples. Reference signals disclosed herein can be processed in the time domain without knowledge of frame offset between uplink and downlink frames. The calibration signal can be recovered by frequency domain processing regardless of the frame offset.

Figure 2A:
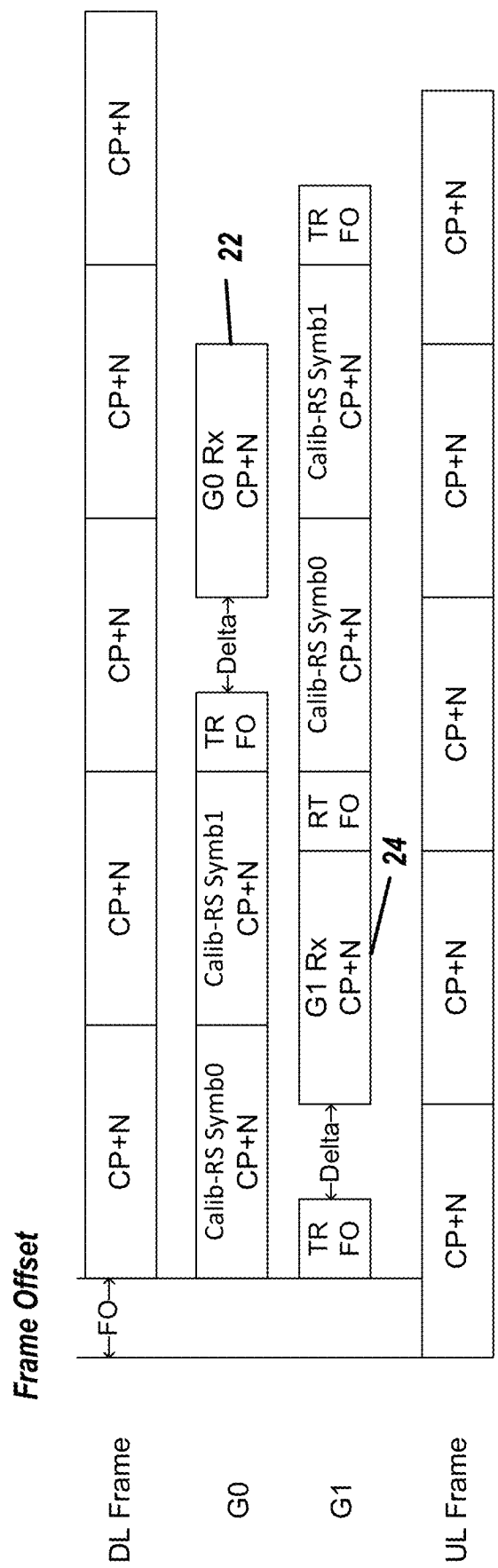
FIG. 2A is an example timing diagram illustrating a timing offset between uplink (UL) and downlink (DL) frames.

FIG. 2A is an example timing diagram illustrating a timing offset between UL and DL frames. In the example illustrated in FIG. 2A, UL and DL frames have a frame offset $TA_{offset}$ of time domain samples. The frame offset can be a transmit to receive switching time or a receive to transmit switching time. The frame offset is labeled as FO in FIG. 2A. There is a gap $T_{delta}$ of time domain samples between the end of a transmit to receive switch and the next uplink symbol boundary. The gap is labeled as Delta in FIG. 2A. The gap $T_{delta}$ can be equal to a slot length minus two times the frame offset. As one example, the frame offset $TA_{offset}$ can be 1600 time domain samples and the gap $T_{delta}$ can be 1184 time domain samples for a 100 MHz system bandwidth. As another example, the frame offset $TA_{offset}$ can be 800 time domain samples and the gap $T_{delta}$ can be 592 time domain samples for a 50 MHz system bandwidth. Each slot or frame has a length that corresponds to a cyclic shift length CP plus a calibration reference symbol length N. The length can be measured in time domain samples. Received UL frames are not aligned with DL transmit frames at a symbol boundary. The frame offset is longer than the cyclically shifted portion of a calibration reference symbol. Accordingly, a receiver side should receive in the middle of two adjacent OFDM symbols from a transmitter.

Figure 2B:
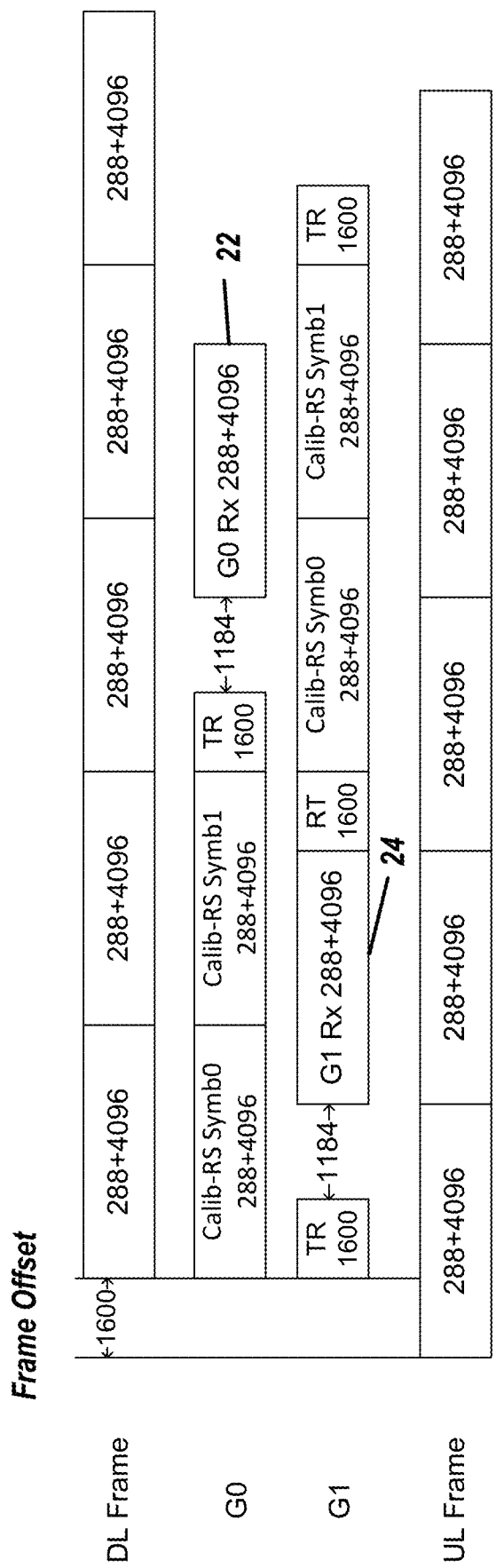
FIG. 2B is another example timing diagram illustrating a timing offset between UL and DL frames.

FIG. 2B is a second example timing diagram illustrating a timing offset between UL and DL frames for a NR system operating at 100 MHz system bandwidth. In the illustrated example, UL and DL frames have a frame offset of $TA_{offset}$=1600 time domain samples. Each slot or frame has a length of 288+4096 time domain samples in FIG. 2B. This is an example of a cyclic shift length CP plus a calibration reference symbol length N from FIG. 2A. FIG. 2B is an example in New Radio (NR). The symbols can be orthogonal frequency domain multiplexing (OFDM) symbols. In some other embodiments, reference symbols in accordance with any suitable principles and advantages disclosed herein can be other types of reference symbols, such as Discrete Fourier Transform-spread-Frequency Divisional Multiple Access (DFT-spread-FDMA) symbols, Interleaved-FDMA (IFDMA), or other time domain waveform symbols.

The example timing diagrams of FIGS. 2A and 2B relate to transmitting a reference signal between groups of antennas. A reference signal that includes two consecutively transmitted calibration reference symbols is transmitted from each group of antennas G0 and G1. The consecutively transmitted reference symbols are transmitted back to back without a break. More details will be provided about the calibration reference symbols below, for example, with reference to FIG. 3.

Each group of antennas G0 and G1 receives a calibration reference symbol that includes portions of 2 consecutively transmitted calibration reference symbols. A group of antennas G0 or G1 and corresponding receive processing circuitry can be arranged to receive in the middle of 2 consecutively transmitted calibration reference symbols from a transmitter. This can be a result of the frame offset between uplink and downlink symbols being greater than a length of a cyclically shifted portion of a calibration reference signal. For example, the first group of antennas G0 receives a calibration reference symbol 22. The calibration reference symbol 22 includes parts of two different transmitted reference signals due to the misalignment between uplink and downlink symbols. Similarly, the second group of antennas G1 receives a calibration reference symbol 24 that includes parts of two different transmitted reference signals due to the misalignment between uplink and downlink symbols. Due to the structure of the transmitted calibration reference symbols, the received calibration reference symbols are received at a receiver side with a cyclic shift. The receive side can then process a received calibration reference symbol to account for this cyclic shift.

Figure 3:
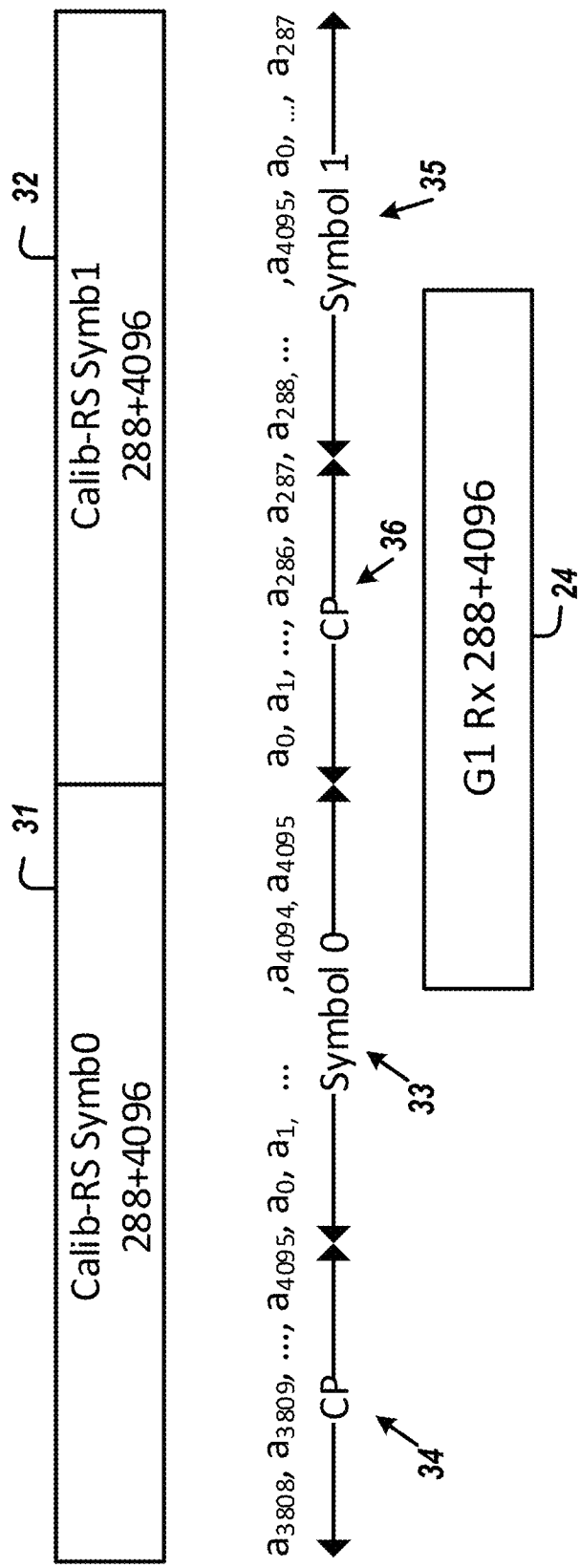
FIG. 3 is an example timing diagram of calibration reference symbols according to an embodiment.

FIG. 3 is an example timing diagram of calibration reference symbols according to an embodiment. A calibration reference signal can include two consecutive calibration reference OFDM symbols including a first calibration reference symbol 31 and a second calibration reference symbol 32.

The first calibration reference symbol 31 includes a symbol 33 and a cyclically shifted portion 34 of the symbol 33. The first calibration reference symbol 31 can consist of the symbol 33 and the cyclically shifted portion 34. The cyclically shifted portion 34 is a cyclic prefix in FIG. 3. The symbol 33 follows directly after the cyclically shifted portion 34 in the first calibration reference symbol 31. The cyclically shifted portion 34 has a length of 288 time domain samples in the example shown in FIG. 3. The length of the cyclically shifted portion 34 can be set by a standard or other specification. The length of the cyclically shifted portion 34 is a cyclic prefix length in the FIG. 3. The symbol 33 includes 4096 time domain samples in the example shown in FIG. 3. The length of the OFDM symbol 33 can be set by a standard or other specification. The cyclically shifted portion 34 includes the last 288 time domain samples of the symbol 33.

The second calibration reference symbol 32 is a cyclically shifted version of the first calibration reference symbol 31. In particular, the second calibration reference symbol 32 is the first calibration reference symbol 31 cyclically shifted by the length of the cyclically shifted portion 34 to the left. The second calibration reference symbol 32 include a symbol 35 and a cyclically shifted portion 36. In the second calibration reference symbol 32, the symbol 35 includes the same time domain samples as the symbol 33 of the first calibration reference symbol 31 except that the time domain samples are in a different order by being cyclically shifted by the length of the cyclically shifted portion 36. Time domain samples of the symbol 33 of the first calibration reference symbol 31 are the beginning 4096 time domain samples of the second calibration reference symbol 32. Accordingly, in the first and second calibration reference symbols 31 and 32, the time domain samples of the symbol 33 repeat back-to-back. The cyclically shifted portion 36 of the second calibration reference symbol 32 has the same length of as the cyclically shifted portion 34 of the first calibration reference symbol. If lengths of cyclically shifted portions 34 and 36 are different, the second calibration reference symbols 32 can be shifted by the length of the cyclically shifted portion 36 to the left.

To account for a receive side frame offset, the first and second calibration reference symbols 31 and 32 can be further cyclically shifted by the frame offset in certain embodiments. The frame offset is 1600 time domain samples in the example illustrated in FIG. 2B. The time domain cyclic shift can correspond to a frequency domain phase ramp.

At the receive side, a received calibration reference symbol 24 can include part of the first calibration reference symbol 31 and part of the second calibration reference symbol 32. The calibration reference symbols 31 and 32 structure and consecutive transmission can result in a continuous phase in the received calibration reference symbol 24 at the receive side. FIG. 3 illustrates that the calibration reference signal 24 can be received at a time corresponding to the middle of the first and second transmitted calibration reference symbols 31 and 32. This corresponds to the timing diagram of FIG. 2B. The received calibration reference symbol 24 includes some of the time domain samples of the symbol 33, time domain samples from the cyclically shifted portion 36, and some time domain samples from the symbol 35. The received calibration reference symbol 24 includes all time domain samples present in the symbol 33 without actually receiving the full symbol 33. Similarly, the received calibration reference symbol 24 includes all time domain samples present in the symbol 35 without actually receiving the full symbol 35. In addition to all time domain samples present in the symbol 33 or 35, the received calibration reference symbol 24 includes additional time domain samples corresponding to the length of the cyclically shifted portion 36.

The symbol 33 can be determined from the received calibration reference symbol 24 by removing an amount of the received calibration reference symbol 24 corresponding to a cyclically shifted portion and cyclically shifting by the frame offset minus any other offsets in the processing chain. One example of another offset is an RRU taking a Fast Fourier Transfer window in a middle of a cyclic prefix instead of at an end of the cyclic prefix. The time domain samples corresponding to the cyclic shift length can be removed by time domain processing. The cyclic shift by the frame offset minus other offsets can be performed by phase ramping in frequency domain processing. This phase ramping in the frequency domain processing can be avoided if such an offset has been pre-compensated from the transmitter side.

A base band unit (BBU) processing a received calibration reference symbol may not have access to fronthaul circuitry and/or one or more RRUs that performs prior processing. The BBU can receive a continuous phase calibration reference signal via fronthaul circuitry and/or one or more RRUs when a calibration reference signal comprising the first and second calibration reference symbols 31 and 32 is transmitted.

Although embodiments disclosed herein may be discussed with reference to a cyclic prefix, any suitable principles and advantages disclosed herein can be applied to consecutive calibration reference symbols with cyclic suffixes.

Figure 4A:
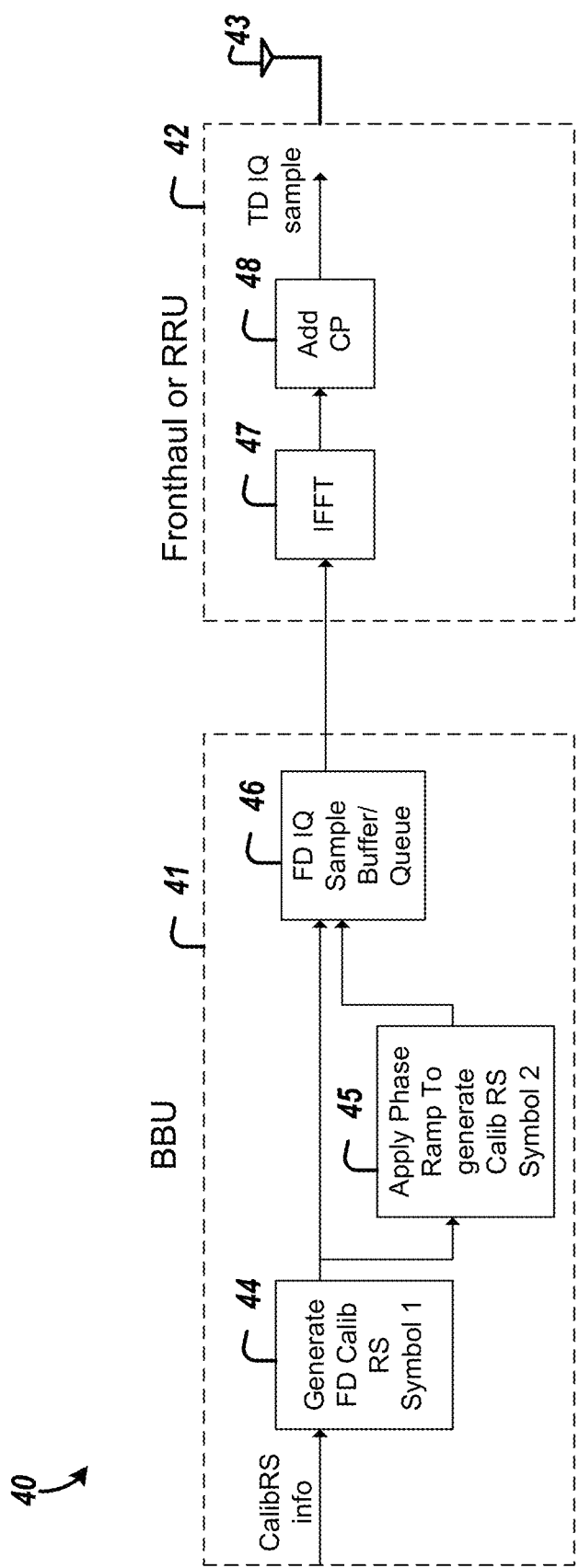
FIG. 4A is a schematic block diagram of a system for transmitting a calibration reference signal according to an embodiment.

FIG. 4A is a schematic block diagram of a system 40 for transmitting a calibration reference signal according to an embodiment. The system 40 includes a base band unit 41, a radio frequency processing unit 42, and at least one antenna 43. The radio frequency processing unit 42 can include a remote radio unit and/or fronthaul processing circuitry.

The base band unit 41 can receive calibration reference information and generate symbols based on the received calibration reference information. The calibration reference information can include a reference signal index, scrambling information, the like, or any suitable combination thereof. The illustrated base band unit 41 includes a reference symbol generation block 44, a phase ramping block 45, and a frequency domain sampling block 46. The base band unit 41 can perform frequency domain processing. The base band unit 41 processes base band signals. The base band unit 41 can include a digital signal processor.

The reference symbol generation block 44 can generate a first symbol for a calibration reference symbol. The first symbol can be a frequency domain symbol. The first frequency domain symbol can be represented by {A0, A1, ... A4095}. The second frequency domain symbol can be represented by {B0, B1, ... B4095}. The second frequency domain symbols Bk can be represented by the following equation with Δ representing the cyclic shift length and N being the number of time domain samples of the symbol:

$$B_k = A_k \times e^{2\pi\Delta(k/N)}, \text{ for } k=0,1,\ldots,4095,$$

where Δ=288, N=4096.

The phase ramping block 45 can apply phase ramping to the first symbol to generate a second symbol that is cyclically shifted relative to the first symbol. The frequency domain sampling block 46 can sample the first and second symbols. The sampling can involve in-phase (I) samples and quadrature (Q) samples. The frequency domain sampling block 46 can buffer and queue samples for sending to radio frequency processing unit 42. The frequency domain sampling block 46 can provide a one symbol delay of the second symbol relative to the first symbol such that the second symbol is the next symbol after the first symbol in the queue. Both the first symbol and the second symbol can go through an additional frequency domain (FD) phase ramp to pre-compensate for frame offset, such that no additional phase ramp compensation on the receiver side is needed. The two FD phase ramps can also be combined in a single phase ramp for the second symbol.

Figure 4B:
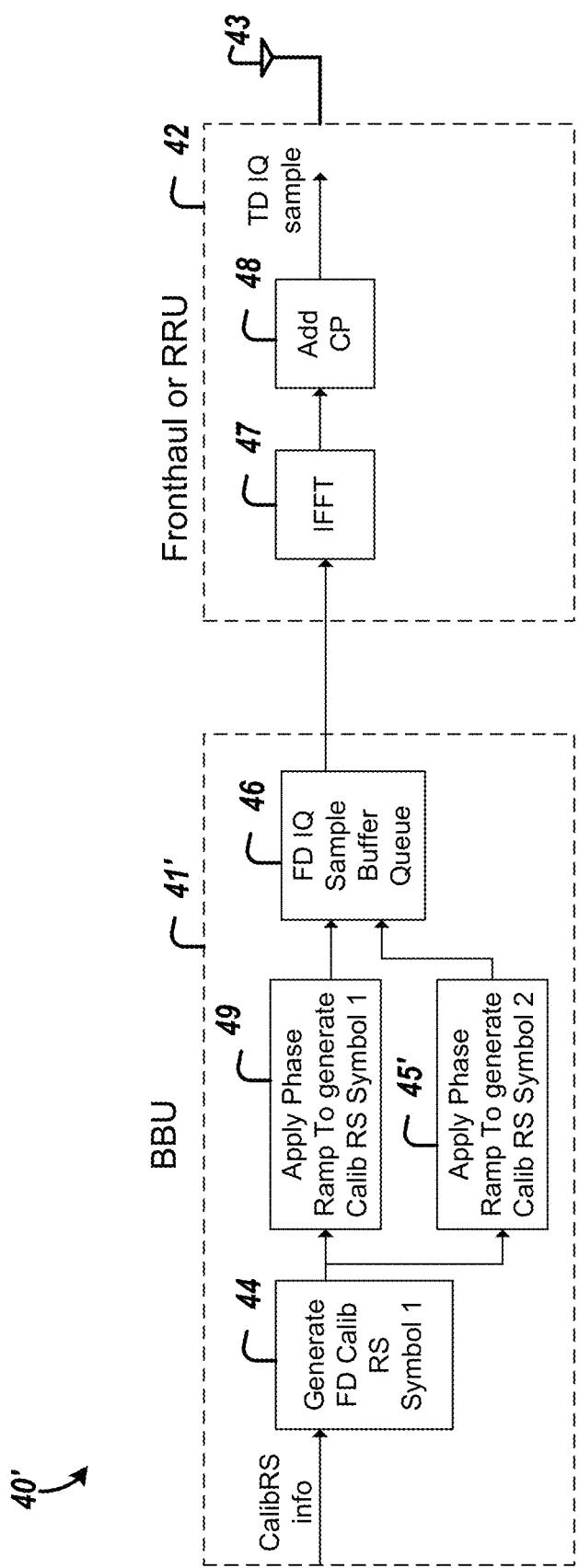
FIG. 4B is a schematic block diagram of a system for transmitting a calibration reference signal according to another embodiment.

FIG. 4B is a schematic block diagram of a system 40' for transmitting a calibration reference signal according to an embodiment. The system 40' can apply phase ramping to first symbol and second symbol to pre-compensate for frame offset and where the two FD phase ramps are combined for the second symbol. The system 40' can generate and transmit two consecutive calibration reference symbols that are cyclically continuous in time that can be processed on the receive side without phase correction. Given an initial calibration sequence, both calibration reference symbols can be mapped to a comb and different phase adjustment can be applied to each symbol. This phase adjustment can be applied in the time domain. The phase adjustment can be a phase ramp that accounts for both the frame offset $TA_{offset}$ and the gap $T_{delta}$. The second calibration reference symbol can be phase shifted such that after frequency domain processing (e.g., inverse Fast Fourier Transform and cyclic prefix addition), the second calibration reference symbol is cyclically continuous with the first calibration reference symbol. Two frequency domain calibration reference symbols can be provided to a radio frequency processing unit, such as a fronthaul, where an inverse Fast Fourier Transform (IFFT) is applied and a cyclic prefix is added.

Unlike in LTE, there can be different carrier frequencies at a transmitter and a receiver in NR, which can create phase rotation issues absent compensation. The different carrier frequencies can introduce different phase offsets between symbols. Phase compensation can be applied in NR to avoid phase rotation across ODFM symbols. A transmitter and a receiver can each apply phase compensation based on its own center frequency. This way a UE can operate without knowledge of the center frequency at the gNB relative to where a synchronization signal/physical broadcast channel (SS/PBCH) block, Remaining Minimum System Information (RMSI), or a bandwidth part (BWP) is transmitted. At a transmitter, phase compensation can be applied to a symbol before up-conversion. At a receiver, phase compensation can be applied after down-conversion. The phase terms for phase compensation can be known at both a gNB and a UE. In certain embodiments, gNB-side phase compensation can be applied at the fronthaul.

In calibration reference symbol generation disclosed herein, calibration reference symbols can be phase compensated at a receive side or a transmit side. Such phase compensation can be in addition to NR-specified phase compensation values applied at the fronthaul. Pre-compensation can be carrier frequency specific.

Referring to FIG. 4B, the system 40' includes a base band unit 41' with a reference symbol generation block 44, phase ramping blocks 45' and 49, and a frequency domain sampling block 46. In the base band unit 41', the first phase ramping block 45' can apply phase ramping to the first symbol to generate a second symbol that is cyclically shifted relative to the first symbol and also includes pre-compensation for the frame offset. The first phase ramping block 45' can alternatively or additionally pre-compensate for one or more other offsets, such as the gap between end of a transmit to receive switch and the next uplink symbol boundary. The second phase ramping block 49 can apply phase ramping to the first symbol to generate a pre-compensated first symbol that is that is cyclically shifted relative to the first symbol to pre-compensate for the frame offset. The second phase ramping circuit 49 can alternatively or additionally pre-compensate for one or more other offsets, such as the gap between end of a transmit to receive switch and the next uplink symbol boundary. For each calibration symbol, a phase corrected signal can be stored by the frequency domain sampling block 46. Alternatively, a common phase adjustment term can be stored and the cyclic shift for each antenna can be generated during transmission.

In certain applications, an additional phase ramp compensation can be applied to pre-compensate for an OFDM symbol-specific phase rotation specified by a standard. For example, in an NR standard, a phase rotation is applied to each OFDM symbol within a 1 millisecond duration. An embodiment of the pre-compensation shown in FIG. 4B can apply a further additional phase offset to the first symbol to pre-compensate for the phase rotation applied to the first and second calibration symbols. In a second example, phase ramping can be applied to the second calibration symbol to pre-compensate for the phase rotation applied to the first and second calibration symbols.

The base band unit 41, the base band unit 41', and the other base band units disclosed herein can include any suitable physical hardware to perform the described functions. Such physical hardware can include at least one processor and memory. The illustrated blocks can be implemented with dedicated circuitry for a particular block and/or with shared hardware programmed and/or configured to perform functionality of two or more blocks. The base band unit 41 can be connected to the radio frequency processing unit 42 via an optical fiber.

Referring to FIGS. 4A and 4B, the radio frequency processing unit 42 can be a RRU or fronthaul. In some instances, the radio frequency processing unit 42 can be implemented by a combination of a RRU and fronthaul. The radio frequency processing unit 42 can process RF signals. The illustrated radio frequency processing unit 42 includes an IFFT block 47 and a cyclic prefix block 48. The IFFT block 47 can transform symbols received from the BBU 41 from the frequency domain to the time domain. A first time domain symbol generated by taking the IFFT of the first frequency domain symbol can be represented by $\{a0, a1, \ldots, a4095\} = \text{IFFT}\{A0, A1, \ldots A4095\}$. A second time domain symbol generated by taking the IFFT of the first second domain symbol can be represented by $\{b0, b1, \ldots, b4095\} = \text{IFFT}\{B0, B1, \ldots B4095\}$. Due to the frequency domain phase ramp by the phase ramping block 45 or 45', the effective time domain second symbol becomes a cyclic shift (to left) of the first symbol: $\{b0, b1, \ldots, b4095\} = \{a288, a289, \ldots, a4095, a0, a1, \ldots, a287\}$.

The cyclic prefix block 48 can add cyclic prefixes to the time domain symbols. The cyclically shifted portions 34 and 36 are examples of cyclic prefixes. The calibration reference symbols output by the radio frequency processing unit 42 can include any suitable principles and advantages of the calibration reference symbols 31 and 32 of FIG. 3. The time domain symbols can include in-phase symbols and quadrature symbols. The radio frequency processing unit 42 and the other radio frequency processing units disclosed herein can include any suitable physical hardware to perform the described functions. The illustrated blocks can be implemented with dedicated circuitry for a particular block and/or with shared hardware configured to perform functionality of two or more blocks.

The antenna 43 can wirelessly transmit a calibration reference symbol that comprises consecutive calibration reference symbols output by the radio frequency processing unit 42. In some instances, a plurality of antennas can transmit the calibration reference signal.

As shown in FIG. 3, a received calibration reference symbol 24 can be received in the middle of two consecutively transmitted calibration reference symbols 31 and 32. Depending on the TDD frame offset, the receive side can observe a calibration reference symbol going through a different cyclic shift. In the example shown in FIG. 2B, an uplink symbol is received at $\text{TA}_{offset} = 1600$ time domain samples before a downlink symbol. Accordingly, the received calibration reference symbol can be represented by: $\{a2495, a2496, \ldots, a2783, a2784, a2785, \ldots, a4095, a0, \ldots, a2782, a2783\}$, where the receive side perceived cyclic prefix is $\{a2495, a2496, \ldots, a2783\}$ and the received side perceived OFDM symbol is $\{a2784, a2785, \ldots, a4095, a0, \ldots, a2782, a2783\}$. The received calibration reference symbol 24 is the transmitted first calibration reference symbol 31 cyclically shifted to the left by the difference between the UL/DL frame offset and the cyclic shift length. In this example, the frame offset is 1600 and the cyclic shift length is 288. Accordingly, in this example, the cyclic shift of the received calibration reference symbol 24 is 1600−288=1312.

Figure 5:
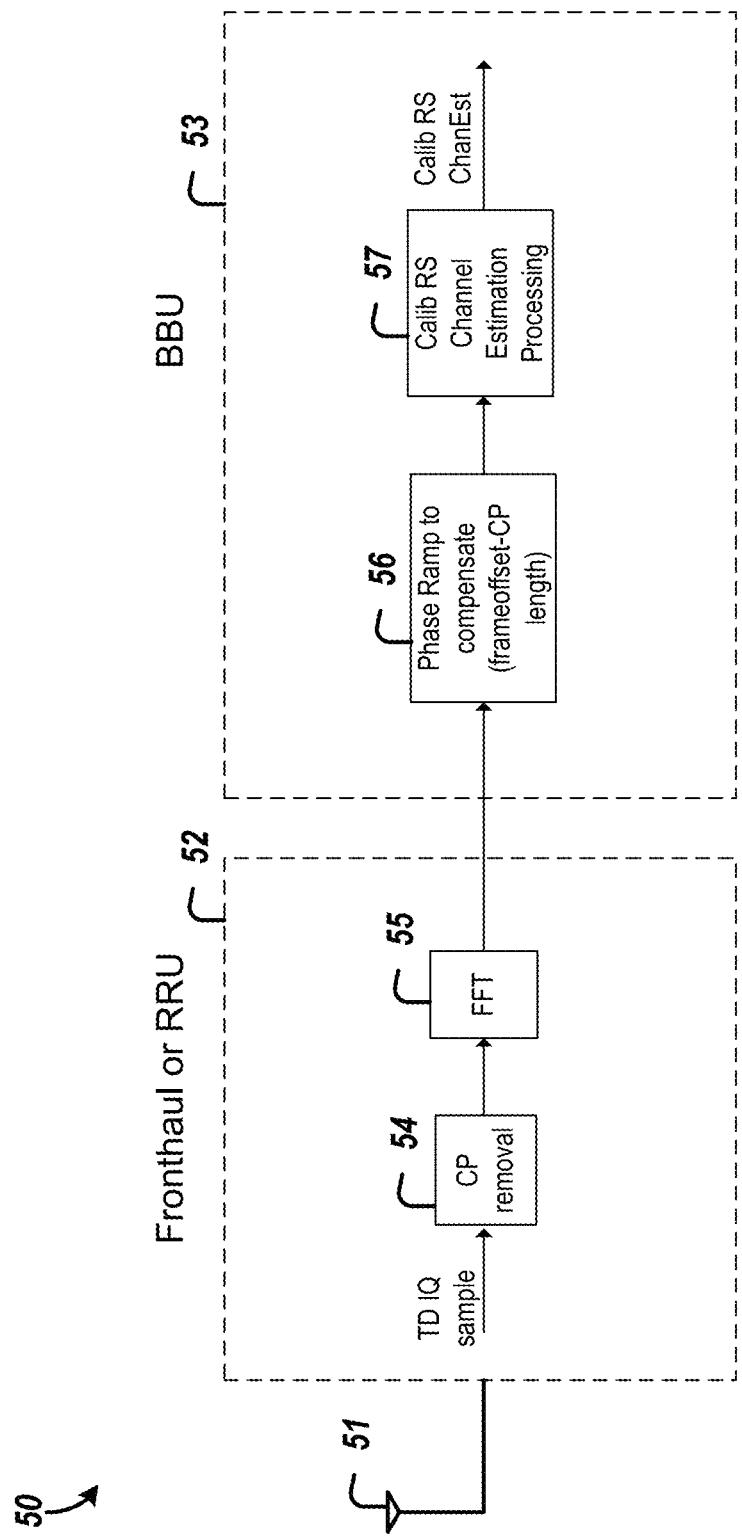
FIG. 5 is a schematic block diagram of a system for processing a received calibration reference signal according to an embodiment.

FIG. 5 is a schematic block diagram of a system 50 for processing a received calibration reference signal according to an embodiment. The system 50 includes at least one antenna 51, a radio frequency processing unit 52, and a base band unit 53. The radio frequency processing unit 52 can include a remote radio unit and/or fronthaul processing circuitry. The base band unit 53 can include any suitable combination of features of the base band unit 41 in certain applications. The radio frequency processing unit 52 can include any suitable combination of features of the radio frequency processing unit 42 in certain applications.

The antenna 51 can receive a transmitted calibration reference symbol. In some instances, a plurality of antennas can receive the calibration reference symbol. As discussed above, a received calibration reference symbol can be a cyclically shifted version of a calibration reference signal symbol that is cyclically shifted by the amount of the frame offset. The cyclic shift compensation or pre-compensation is to the left in the example of FIGS. 2 and 3. In some other applications, the cyclic shift can be to the other direction.

The system 50 can apply phase ramp compensation to compensate for the time domain cyclic shift on the receiver side. In certain instances, it is possible to pre-compensate for the time domain cyclic shift on the transmit waveform on each transmitting antenna and the receiver side compensation may not be needed.

The radio frequency processing unit 52 can be a RRU or fronthaul. In some instances, the radio frequency processing unit 52 can be implemented by a combination of a RRU and fronthaul. The radio frequency processing unit 52 can process time domain samples in the RF domain. The illustrated radio frequency processing unit 52 includes a cyclic prefix removal block 54 and a Fast Fourier Transform (FFT) block 55. The cyclic prefix removal block 54 can remove the beginning time domain samples of the received calibration reference symbol corresponding to the cyclic shift length. The FFT block 55 can transform symbols output by the cyclic prefix removal block from the time domain to the frequency domain.

The base band unit 53 can include a phase ramping block 56 and a channel estimation block 57. The phase ramping block 56 can account for the frame offset and any other DL/UL shift values. In embodiments with pre-compensation, such phase ramping can be avoided. For example, the phase ramping block 56 can compensate for the cyclic shift in the received calibration reference signal by applying a phase ramp corresponding to a frame offset minus the cyclic prefix length in the examples illustrated in FIGS. 2A, 2B and 3. As another example, the phase ramping block 56 can compensate for the cyclic shift in the received calibration reference signal by applying a phase ramp corresponding to a frame offset and any other DL/UL shift values in applications where downlink symbols are received by a frame offset before uplink symbols. The channel estimation block 57 can process the output of the phase ramping block 56 and generate a channel estimate and/or other calibration data. The base band unit 53 can calculate calibration coefficients from one or more antennas, including the antenna 51, based on processing the received reference symbol. A calculated calibration coefficient can be based on the channel estimate generated by the channel estimation block 57.

Figure 6:
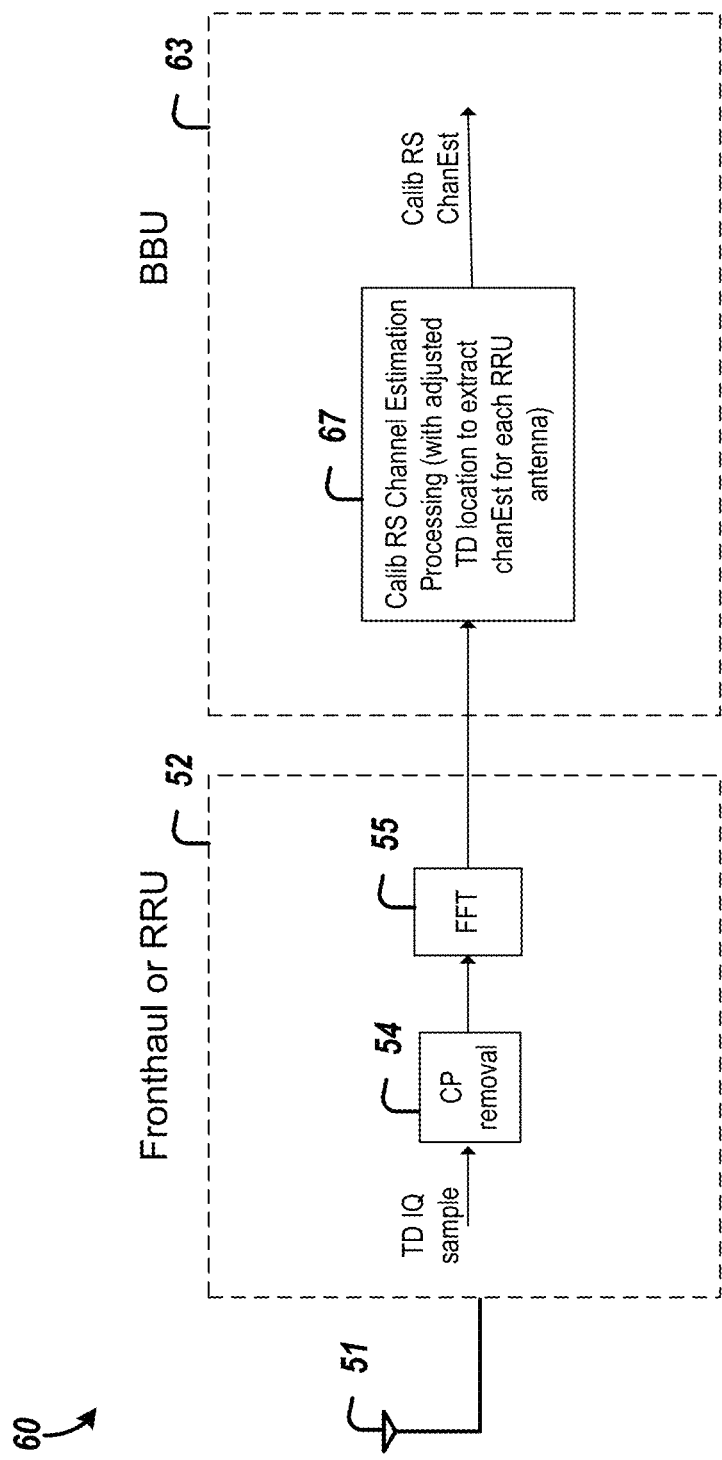
FIG. 6 is a schematic block diagram of a system for processing a received calibration reference signal according to another embodiment.

FIG. 6 is a schematic block diagram of a system 60 for processing a received calibration reference signal according to an embodiment. In practice, relatively long offset can present technical challenges for channel estimation. For example, with a frame offset of 1600 time domain samples, a cyclic shift due to the frame offset can be greater than ¼ of a length of an OFDM symbol. This level of frame offset may not be completely transparent to UE processing as the SRS time domain windowing may be adversely impacted. Hence, a-priori information of an offset amount may be desired. In certain applications, instead of phase ramp compensation, a-priori information about an expected cyclic shift at a receive side can be used in a channel estimation stage to adjust the time domain channel estimate window location for each antenna to extract an accurate channel estimate for each antenna. A base band unit 63 includes a channel estimation block 67. The channel estimation block 67 can adjust a time domain location to extract a channel estimate for each antenna based on, a-priori information about the expected cyclic shift at the receive side. The base band unit 63 can calculate calibration coefficients from one or more antennas, including the antenna 51, based on processing the received reference symbol. A calculated calibration coefficient can be based on the channel estimate generated by the channel estimation block 67.

Figure 7:
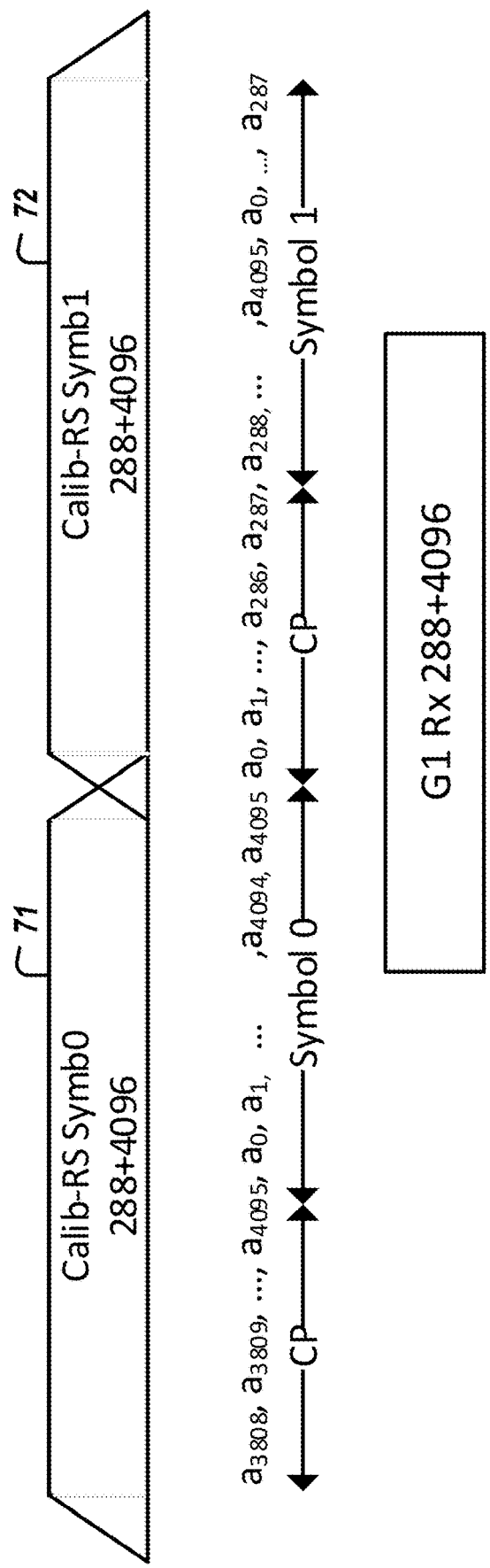
FIG. 7 illustrates a timing diagram of a calibration reference signal with weighted-overlap-and-add roll-off according to an embodiment.

Calibration reference signals can be implemented in applications with transmit weighted-overlap-and-add (WOLA). FIG. 7 illustrates a timing diagram of a calibration reference signal with WOLA roll-off applied on both sides of OFDM symbols according to an embodiment. With WOLA roll-off, Adjacent Channel Leakage Ratio (ACLR) can be reduced. FIG. 7 illustrates calibration reference symbols 71 and 72. These symbols are like symbols 31 and 32, respectively, except that WOLA roll-off is applied at a beginning and end of each of the calibration reference symbols 71 and 72. The calibration reference symbols disclosed herein are robust to transmit WOLA where weight values are properly normalized. Overlapping parts of time domain samples of consecutive calibration reference symbols can have weight coefficients that sum to be 1.

The timing diagram of FIG. 2B indicates that a calibration reference process can occur within 5 symbols of time domain samples. Even with full control of an RRU and fronthaul timing scenario, there can be at least four symbols for a calibration reference process. A minimum amount of time for calibration can correspond to 1 frame offset (FO)+1 transmit to receive transition (TR)+1 symbol+1TR+1Symb+1TR. This equates to FO+3TR+2 symbols. In the example in FIG. 2B, 1 symbol=4096+288 time domain samples, 1TR>1200 or 1600 time domain samples (3 TRs=3600~4800), and 1 FO=1600 time domain samples. Together 1 FO+3TR is around 5200~6400 time domain samples in this example. At least 4 symbols are involved in a calibration reference process. Accordingly, even if we assume full control of transmit and receive timing on RRU side, only 1 extra symbol can be saved. Of the 5 symbols in FIG. 2B, 1 can be considered overhead to account for differences in transmit and receive timing on the RRU side.

Figure 8:
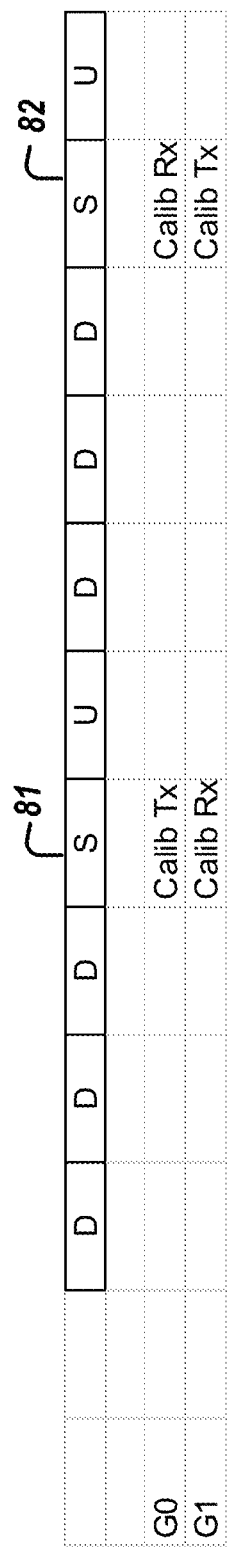
FIG. 8 is a timing diagram illustrating timing for transmitting and receiving calibration reference signals according to an embodiment.

FIG. 8 is a timing diagram illustrating timing for transmitting and receiving calibration reference signals according to an embodiment. In this embodiment, there can be a single switch between transmitting and receiving in a slot for calibration. Both a first group G0 of antennas and a second group G1 of antennas can use the same or substantially the same transit/receive switch waveform. There can be only one switch from DL to UL in a special slot 81 or 82. The first group G0 and the second group G1 can alternate a DL/UL pattern to transmit and receive calibration reference signals in specials slots. In special slot 81, the first group G0 transmits calibration reference signals and the second group G1 receives calibration reference signals. Then, in special slot 82, the first group G0 receives calibration reference signals and the second group G1 transmits calibration reference signals. In this embodiment, two extra symbols after the last downlink slot before a special slot can be sufficient for calibration. With the transmitting and receiving of calibration reference signals in special slots with the timing shown in FIG. 8, there are no additional transmit to receive or receive to transmit transitions specifically for calibration. There is only one switching transition for each group. The one switching transition would be implemented anyway for transitioning from downlink before a special slot to uplink after the special slot.

A calibration reference signal can also be sent in the end of a DL portion of the slot. The calibration reference signal could be reused in conjunction with a channel state information reference signal (CSI-RS). The first group G0 can send CSI-RS on one special slot (e.g., special slot 81). The second group G1 can send CSI-RS on the alternate special slot (e.g., special slot 82). The RRUs associated with G0/G1 can use CSI-RS for calibration. One or more user equipments (UEs) can use CSI-RS for CSI reporting.

Calibration reference signals disclosed herein can be any suitable reference signals. For example, the calibration reference signals disclosed herein can be implemented in accordance with any suitable principles and advantages of Sounding Reference Signals (SRS), CSI-RS, a generic chirp sequence, the like, or any suitable combination thereof. A calibration reference symbol can be generated based on Gold sequence, Zadoff-Chu sequence, an UL SRS sequence, a DL CSI-RS sequence, or DL Demodulation Reference Signal (DMRS) sequence. A resource of a calibration reference signal can be signaled and/or configured to UEs such that they can use the same CSI-RS sequence for DL CSI processing.

Although certain embodiments are described with reference to using full OFDM symbols for calibration, any suitable principles and advantages disclosed herein can be applied to applications where a partial OFDM symbol (e.g., a half symbol) is used for calibration. For example, a half symbol can be used to send a calibration reference symbol. At a receiver side, a BBU side can receive frequency domain samples, perform an IFFT back to the time domain, extract a corresponding calibration reference signal, and perform an FFT back to the frequency domain to obtain a channel estimate for a calibration reference signal.

Figure 9:
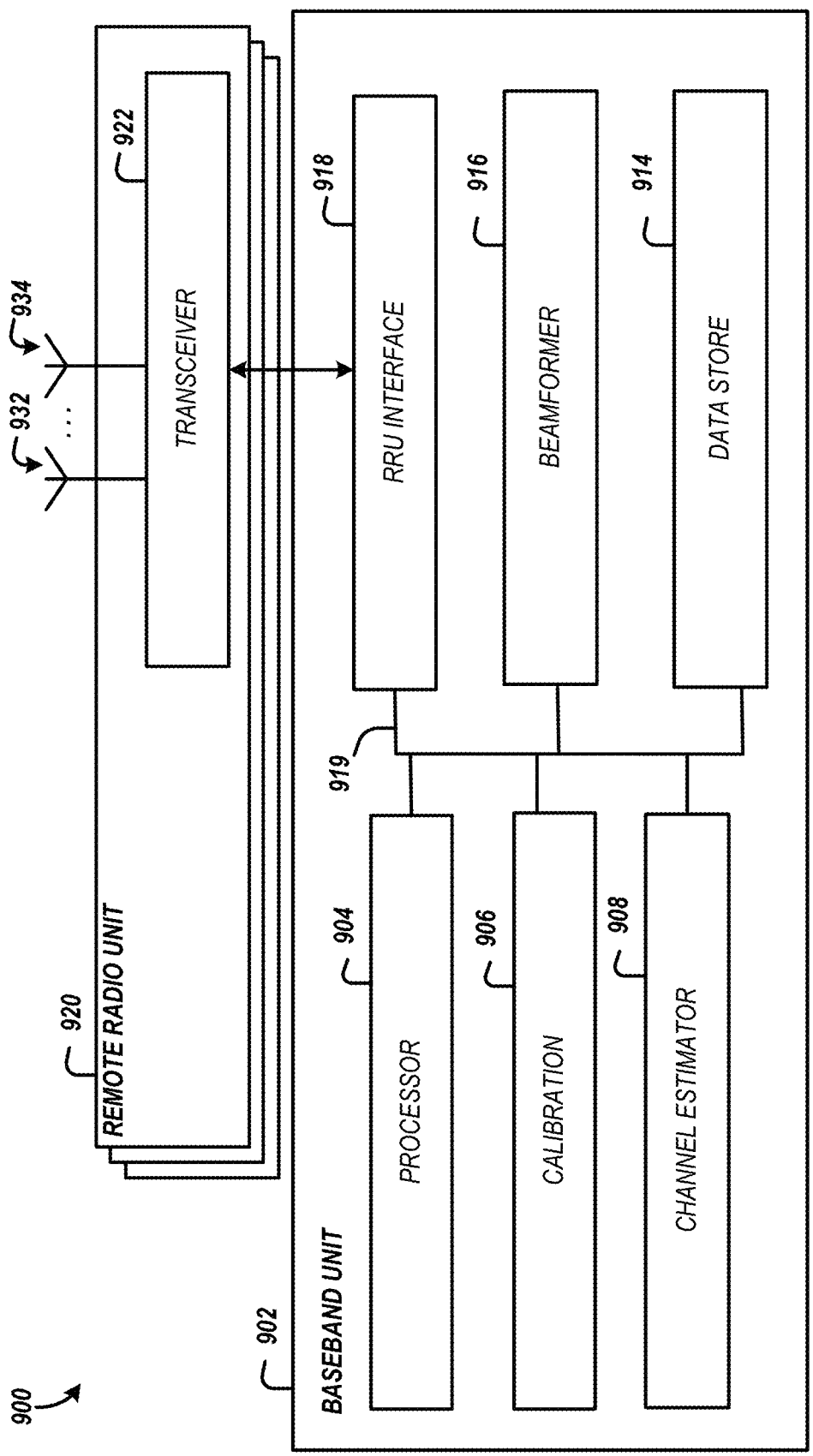
FIG. 9 is a block diagram illustrating an example network system that includes base band unit and remote radio units according to an embodiment.

A network system can be configured to generate, transmit, receive, and/or process calibration reference signals in accordance with any suitable principles and advantages disclosed herein. The network system can use channel estimates determined based on calibration reference signals to calibrate RRU antennas for UL/DL reciprocal channel estimate for wireless communication. The network system can exchange TDD MIMO information with UEs. FIG. 9 illustrates an example network system. The network system can operate in any suitable network environment, such as the network environment 230 of FIG. 12 and/or any suitable network environment. The network system can include any suitable RRUs, fronthaul circuitry, and/or BBUs disclosed herein.

FIG. 9 is a block diagram illustrating an example network system 900 that includes base band unit 902 and remote radio units 920 according to an embodiment. The network system 900 of FIG. 9 can generate, transmit, receive, and process reference signals in accordance with any suitable principles and advantages disclosed herein. The base band unit 902 can be coupled with at least one remote radio unit 920. The base band unit 902 is an example of a processing unit that can determine generate and/or process calibration reference signals in accordance with any suitable principles and advantages disclosed herein. The base band unit 902 can be coupled with a plurality of remote radio units 920 as illustrated. Such remote radio units 920 can be distributed. The remote radio units 920 and/or fronthaul circuitry can perform radio frequency processing disclosed herein.

A remote radio unit 920 can include one or more antennas, such as at least a first antenna 932 and a second antenna 934, for wireless communications. The wireless communications can be, for example, MIMO wireless communications. A remote radio unit can include any suitable number of antennas and/or arrays of antennas. The antennas 932 and 934 of the RRU 920 are coupled with a transceiver 924. The transceiver 924 can perform any suitable features described with reference to the radio frequency processing units disclosed herein. The transceiver 924 includes a receiver and a transmitter. The receiver can process signals received via the antennas 932 and/or 934. The receiver can include blocks of the radio frequency processing unit 52 of FIGS. 5 and 6. The transceiver 924 can provide the processed signals to an RRU interface 916 included in the BBU 902. The transceiver 924 can include any suitable number of receive paths. The transmitter can process signals received from the BBU 902 for transmission via the antennas 932 and/or 934. The transmitter of the transceiver 924 can provide signals to the antennas 932 and/or 934 for transmission. The transmitter can include blocks of the radio frequency processing unit 42 of FIG. 4A and/or FIG. 4B. The transceiver 924 can include any suitable number of transmit paths. The transceiver 924 can include different transmit and receive paths for each antenna 932 and 934.

As illustrated, the BBU 902 includes a processor 904, a calibration block 906, a channel estimator 908, data store 914, a beamformer 916, and an RRU interface 918, and a bus 919. The bus 919 can couple several elements of the BBU 902. Data can be communicated between elements of the BBU 902 over the bus 919.

The processor 904 can include any suitable physical hardware configured to perform the functionality described with reference to the processor 904. The processor 904 can manage communications between the network system 900 and UEs and/or network nodes. For example, the processor 904 can schedule traffic and cause control information to be sent to UEs. The processor 904 can include a processor configured with specific executable instructions, a microprocessor, a microcontroller, a digital signal processor (DSP), an application specific integrated circuit (ASIC), a programmable logic device such as field programmable gate array (FPGA), the like, or any combination thereof designed to perform the functions described herein. The processor 904 can be implemented by any suitable combination of computing devices and/or discrete processing circuits in certain applications.

The calibration block 906 can generate reference signals and process received reference signals to compute calibration coefficient. For example, the calibration block 906 can apply phase ramping to generate a second reference symbol based on a first reference symbol. As another example, the calibration block 906 can process a received reference symbol to account for frame offset and cyclic shift length. The calibration block 906 can coordinate transmission and/or reception of reference signals for calibration. These reference signals can be used to estimate UL and DL channels in between RRUs (transmitted from antenna group G0 to and received by antenna group G1, and vice versa) and be used to derive calibration coefficients to facilitate reciprocal based channel estimation and beamforming. Accordingly, the calibration block 906 can generate a channel estimate of calibration reference signals transmitted from antenna group G0 to group G1 and also from antenna group G1 to antenna group G0. Then the calibration block 906 can use these channel estimates to derive calibration coefficients of all RRU antennas for reciprocal beamforming purposes. The calibration block 906 can determine timing of slots for transmission and reception of reference signals based on any suitable principles and advantages of the timing diagrams disclosed herein. The calibration block 906 can be implemented by dedicated circuitry and/or by circuitry of the processor 904.

The channel estimator 908 can generate channel estimates based processed calibration reference signals. The channel estimator 908 can generate channel estimates for various links in a wireless communication environment. The channel estimator 908 can be implemented by dedicated circuitry and/or by circuitry of the processor 904. In some instances, the channel estimator 908 can include circuitry for channel estimation for SRS and/or CSI-RS. The channel estimator 908 can generate any suitable calibration data from processed calibration reference signals.

As illustrated, the processor 904 is in communication with the data store 914. The data store 914 can store instructions that can be executed by one or more of the processor 904, the calibration block 906, or the channel estimator 908 to implement any suitable combination of the features described herein. The data store 914 can retain information associated with one or more of antennas for which calibration is desired, network conditions, network traffic information, channel estimates, or the like. The data store 914 can store any other suitable data for the base band unit 902.

The beamformer 916 can generate parameters for serving nodes for UEs. The parameters can include one or more of transmission mode, time, frequency, power, beamforming matrix, tone allocation, or channel rank. The beamformer 916 can determine optimal parameters for RRUs 920 coupled with the BBU 902 that facilitate a network-wide optimization of downlink data transmissions. Similar functionality can be implemented for receiving uplink data transmission. The beamformer 916 is an example of an advanced precoding block that can enhance wireless communication in a TDD MIMO network. The beamformer 916 can apply calibration coefficients generated by any suitable calibration data generated from a received calibration reference signal disclosed herein.

The illustrated processor 904 is in communication the RRU interface 918. The RRU interface 918 can be any suitable interface for proving signals to an RRU 920 and receiving signals from the RRU 920. As an example, the RRU interface 918 can be a Common Public Radio Interface.

Figure 10:
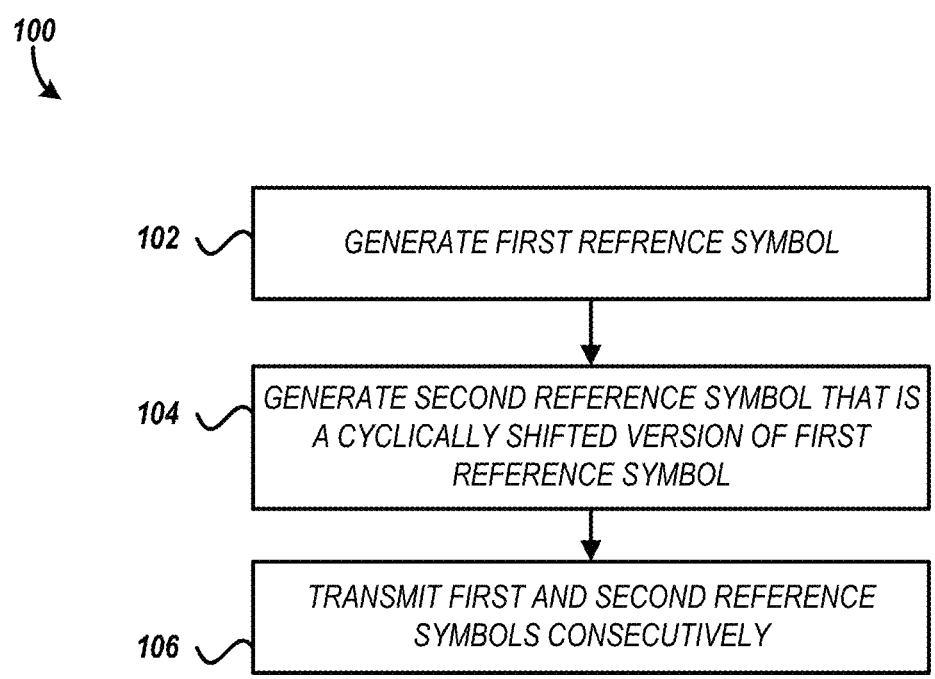
FIG. 10 is a flow diagram of an example method of transmitting a calibration reference signal according to an embodiment.

FIG. 10 is a flow diagram of an example method 100 of transmitting a calibration reference signal according to an embodiment. The method 100 can be performed by any suitable TDD MIMO system disclosed herein. The calibration reference signal can comprise OFDM symbols. Any suitable principles and advantages associated with generating calibration reference signals disclosed herein can be implemented in the method 100. The method 100 can be performed by any suitable hardware, such as the systems of FIGS. 4 and/or 9. Operations of any of the methods disclosed herein can be performed in any suitable order as suitable.

At block 102, a first reference symbol comprising a symbol and a cyclically shifted portion of the symbol is generated. The cyclically shifted portion has a cyclic shift length. The cyclically shifted portion can be a cyclic prefix. Generating the first reference symbol comprises adding the cyclically shifted portion in a time domain. Examples of the first reference symbol include the first calibration reference symbol 31 of FIG. 3 and the first calibration reference symbol 71 of FIG. 7. WOLA can be applied in generating the first reference symbol.

The second reference symbol is generated at block 104. The second reference symbol is a cyclically shifted version of the first calibration symbol that is cyclically shifted relative to the first reference symbol by the cyclic shift length. Generating the second reference symbol can comprise applying a phase ramp to at least the symbol of the first reference symbol. Examples of the second reference symbol include the second calibration reference symbol 32 of FIG. 3 and the second calibration reference symbol 72 of FIG. 7.

In certain instances, phase ramping can additionally be applied to the first and second reference symbols to precompensate for at least a frame offset between uplink symbols and downlink symbols and/or any additional DL/UL offset.

At block 106, the first and second reference symbols are transmitted consecutively. The transmission can occur during a special slot. The first and second reference symbols are wirelessly transmitted via at least one antenna.

Figure 11:
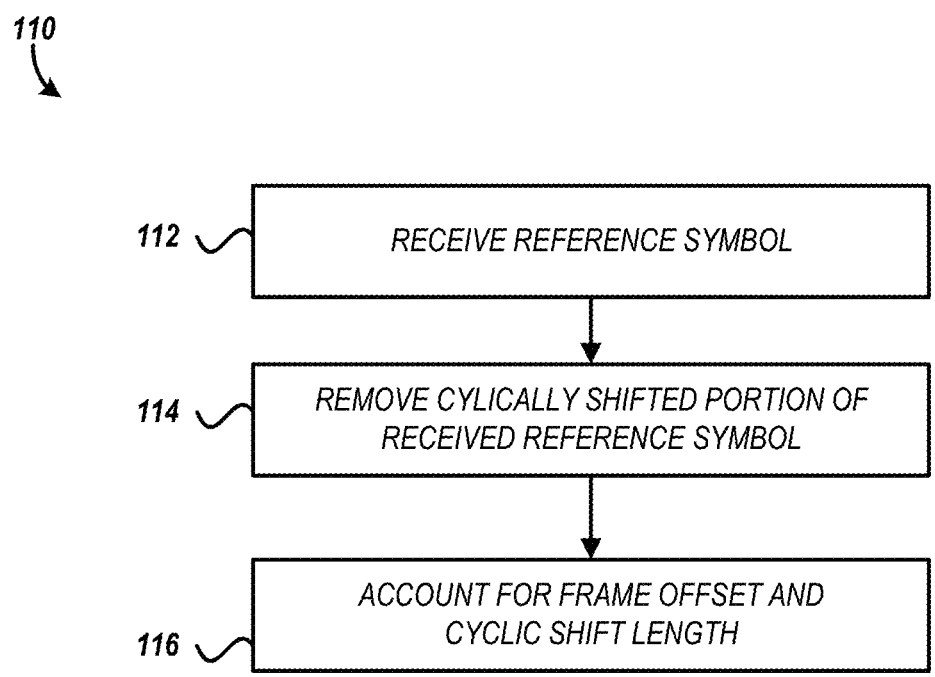
FIG. 11 is a flow diagram of an example method of processing a received calibration reference signal according to an embodiment.

FIG. 11 is a flow diagram of an example method 110 of processing a received calibration reference signal according to an embodiment. The method 110 can be performed by any suitable TDD MIMO system disclosed herein. The calibration reference signal can be transmitted by the method 100. The calibration reference symbol can include OFDM symbols. Any suitable principles and advantages associated with processing calibration reference signals disclosed herein can be implemented in the method 110. The method 110 can be performed by any suitable hardware, such as any of the systems of FIG. 5, 6, or 9. Operations of any of the methods disclosed herein can be performed in any suitable order as suitable.

At block 112, a reference symbol is received via at least one antenna. The reference symbol comprises a portion of a first transmitted reference symbol and a portion of a second transmitted reference symbol. The first transmitted reference symbol comprises a symbol and a cyclically shifted portion of the symbol having a cyclic shift length. The second transmitted reference symbol is a cyclically shifted version of the first transmitted reference symbol that is cyclically shifted relative to the first transmitted reference symbol by the cyclic shift length.

A cyclically shifted portion of the received reference signal can be removed at block 114. This can involve removing time domain samples of the reference signal corresponding to the cyclic shift length. Time domain processing can be performed in an RRU and/or fronthaul circuitry.

At block 116, the reference symbol is processed in a frequency domain to account for a frame offset between uplink symbols and downlink symbols and the cyclic shift length. The frequency domain processing can comprise applying a phase ramp. The frequency domain processing can comprise using a priori information to account for the frame offset and/or any other DL/UL shift values. After processing at block 116, at least one channel estimate and/or other calibration data (e.g., coefficient) can be generated.

Figure 12:
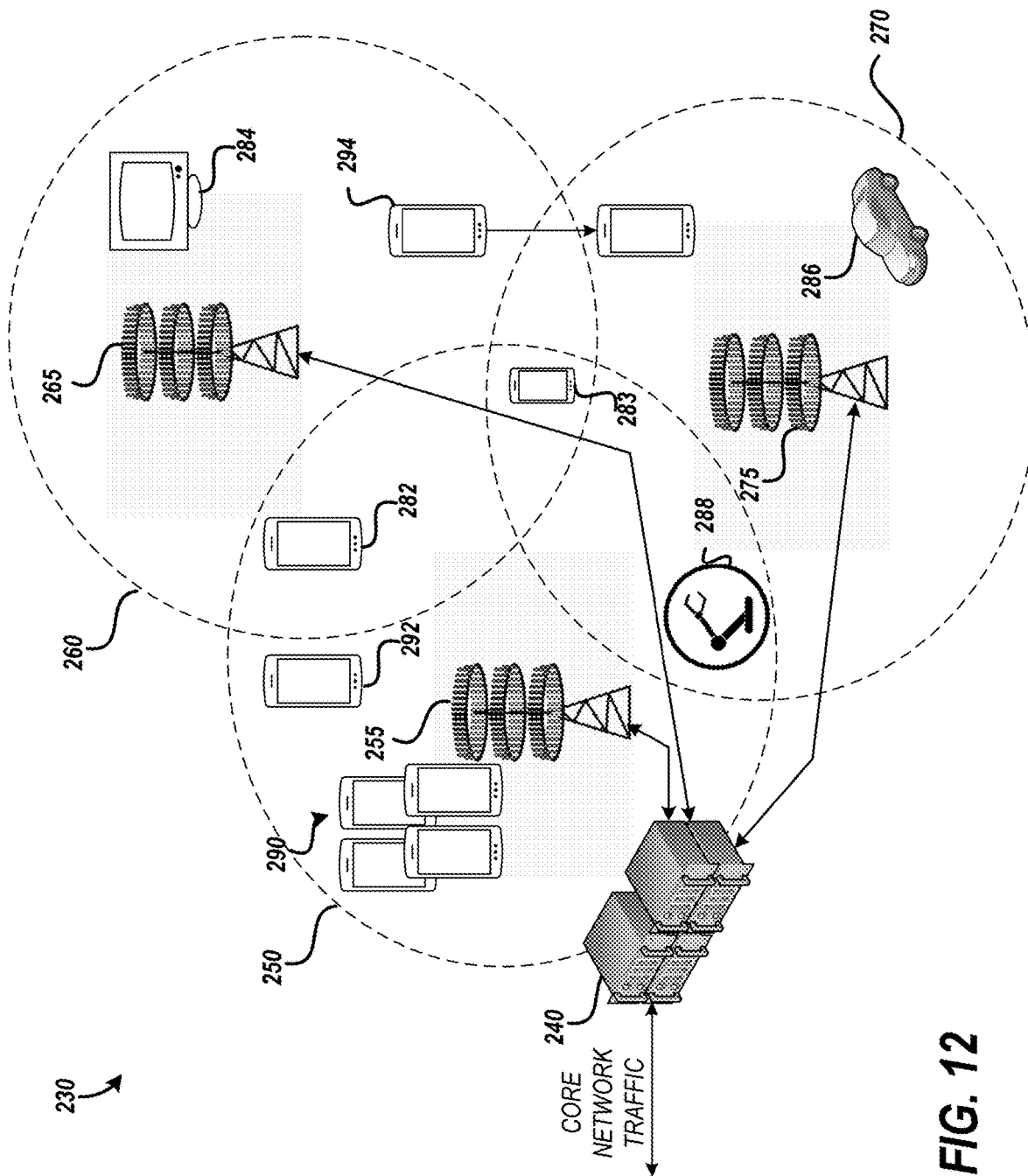
FIG. 12 is a diagram illustrating an example multiple-input multiple-output (MIMO) network environment in which reference signals can be wirelessly transmitted and received.

FIG. 12 is a diagram illustrating an example multiple-input multiple-output (MIMO) network environment 230 in which reference signals can be wirelessly transmitted. Various UEs can wirelessly communicate with a network system in the MIMO network environment 230. Such wireless communications can achieve high throughputs. Antennas of MIMO network environment 230 for wirelessly communicating with UEs can be distributed. Channel estimates for channels between different nodes can be performed in the MIMO network environment 230 based on reference signals in accordance with any suitable principles and advantages disclosed herein.

Various standards and/or protocols may be implemented in the MIMO network environment 230 to wirelessly communicate data between a base station and a wireless communication device. Some wireless devices may communicate using an orthogonal frequency-division multiplexing (OFDM) digital modulation scheme via a physical layer. Example standards and protocols for wireless communication in the environment 230 can include the third generation partnership project (3GPP) Long Term Evolution (LTE), Long Term Evolution Advanced (LTE Advanced), 3GPP New Radio (NR) also known as 5G, Global System for Mobile Communications (GSM), Enhanced Data Rates for GSM Evolution (EDGE), Worldwide Interoperability for Microwave Access (WiMAX), and the IEEE 802.11 standard, which may be known as Wi-Fi. In some systems, a radio access network (RAN) may include one or more base stations associated with one or more evolved Node Bs (also commonly denoted as enhanced Node Bs, eNodeB s, or eNB s), gNBs, or any other suitable Node Bs (xNBs). In some other embodiments, radio network controllers (RNCs) may be provided as the base stations. A base station provides a bridge between the wireless network and a core network such as the Internet. The base station may be included to facilitate exchange of data for the wireless communication devices of the wireless network. A base station can perform reference signal channel estimation is accordance with any suitable principles and advantages disclosed herein.

A wireless communication device may be referred to as a user equipment (UE). The UE may be a device used by a user such as a smartphone, a laptop, a tablet computer, cellular telephone, a wearable computing device such as smart glasses or a smart watch or an ear piece, one or more networked appliances (e.g., consumer networked appliances or industrial plant equipment), an industrial robot with connectivity, or a vehicle. In some implementations, the UE may include a sensor or other networked device configured to collect data and wirelessly provide the data to a device (e.g., server) connected to a core network such as the Internet. Such devices may be referred to as Internet of Things (IoT) devices. A downlink (DL) transmission generally refers to a communication from the base transceiver station (BTS) or eNodeB to a UE. An uplink (UL) transmission generally refers to a communication from the UE to the BTS.

FIG. 12 illustrates a cooperative, or cloud radio access network (C-RAN) environment 230. In the environment 230, the eNodeB functionality is subdivided between a base band unit (BBU) 240 and multiple remote radio units (RRUs) (e.g., RRU 255, RRU 265, and RRU 275). The network system of FIG. 12 includes the BBU 240 and the RRUs 255, 265, and 275. An RRU may include multiple antennas, and one or more of the antennas may serve as a transmit-receive point (TRP). The RRU and/or a TRP may be referred to as a serving node. The BBU 240 may be physically connected to the RRUs such as via an optical fiber connection. The BBU 240 may provide operational information to an RRU to control transmission and reception of signals from the RRU along with control data and payload data to transmit. The RRU may provide data received from UEs within a service area associated with the RRU to the network. As shown in FIG. 12, the RRU 255 provides service to devices within a service area 250. The RRU 265 provides service to devices within a service area 260. The RRU 275 provides service to devices within a service area 270. For example, wireless downlink transmission service may be provided to the service area 270 to communicate data to one or more devices within the service area 270.

In the environment 230, a network system can wirelessly communicate with UEs via distributed MIMO. For example, the UE 283 can wirelessly communicate MIMO data with antennas of the network system that include at least one antenna of the RRU 255, at least one antenna of the RRU 265, and at least one antenna of the RRU 275. As another example, the UE 282 can wirelessly communicate MIMO data with distributed antennas that include at least one antenna of the RRU 255 and at least one antenna of the RRU 265. As one more example, the UE 288 can wirelessly communicate MIMO data with distributed antennas that include at least one antenna of the RRU 255 and at least one antenna of the RRU 275. Any suitable principles and advantages of the reference signal channel estimation disclosed herein can be implemented in such distributed MIMO applications, for example.

The illustrated RRUs 255, 265, and 275 include multiple antennas and can provide MIMO communications. For example, an RRU may be equipped with various numbers of transmit antennas (e.g., 2, 4, 8, or more) that can be used simultaneously for transmission to one or more receivers, such as a UE. Receiving devices may include more than one receive antenna (e.g., 2, 4, etc.). An array of receive antennas may be configured to simultaneously receive transmissions from the RRU. Each antenna included in an RRU may be individually configured to transmit and/or receive according to a specific time, frequency, power, and direction configuration. Similarly, each antenna included in a UE may be individually configured to transmit and/or receive according to a specific time, frequency, power, and direction configuration. The configuration may be provided by the BBU 240.

The service areas shown in FIG. 12 may provide communication services to a heterogeneous population of user equipment. For example, the service area 250 may include a cluster of UEs 290 such as a group of devices associated with users attending a large event. The service area 250 can also include an additional UE 292 that is located away from the cluster of UEs 290. A mobile user equipment 294 may move from the service area 260 to the service area 270. Another example of a mobile user equipment is a vehicle 186 which may include a transceiver for wireless communications for real-time navigation, on-board data services (e.g., streaming video or audio), or other data applications. The environment 230 may include semi-mobile or stationary UEs, such as robotic device 288 (e.g., robotic arm, an autonomous drive unit, or other industrial or commercial robot) or a television 284, configured for wireless communications.

A user equipment 282 may be located with an area with overlapping service (e.g., the service area 250 and the service area 260). Each device in the environment 230 may have different performance needs which may, in some instances, conflict with the needs of other devices.

Channel estimation in the network environment 230, such as estimation of channels between UEs and RRUs using reference signals in accordance with any suitable principles and advantages disclosed herein, can implement any suitable principles and advantages of calibration reference signals disclosed herein. An accurate estimate for a wireless communication channel based on a calibration reference signal can be useful for calibration and/or for precoding.

Depending on the embodiment, certain acts, events, or functions of any of the processes or algorithms described herein can be performed in a different sequence, can be added, merged, or left out altogether (e.g., not all described operations or events are necessary for the practice of the process or algorithm). Moreover, in certain embodiments, operations, or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," "such as," and the like, unless specifically stated otherwise, or otherwise understood within the context as used, is generally intended to convey that certain embodiments include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without other input or prompting, whether these features, elements, and/or steps are included or are to be performed in any particular embodiment. The terms "comprising," "including," and the like are synonymous and are used inclusively, in an open-ended fashion, and do not exclude additional elements, features, acts, operations, and so forth. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated or generally understood from context, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements. Connections can be via an air interface and/or via wires and/or via optical fiber and/or via any other suitable connection.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, circuit blocks and/or method blocks described herein may be deleted, moved, added, subdivided, combined, arranged in a different order, and/or modified. Each of these blocks may be implemented in a variety of different ways. Any portion of any of the methods disclosed herein can be performed in association with specific instructions stored on a non-transitory computer readable storage medium being executed by one or more processors. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method of processing reference symbols, the method comprising:
    receiving, from at least one antenna, a reference symbol comprising a portion of a first transmitted reference symbol and a portion of a second transmitted reference symbol, wherein the first transmitted reference symbol comprises a symbol and a cyclically shifted portion of the symbol having a cyclic shift length, and wherein the second transmitted reference symbol comprises a cyclically shifted version of the first transmitted reference symbol that is cyclically shifted relative to the first transmitted reference symbol by the cyclic shift length; and
    processing the reference symbol.

2. The method of claim 1, wherein said processing the reference symbol comprises accounting for a frame offset between uplink symbols and downlink symbols.

3. The method of claim 2, wherein said processing the reference symbol comprises accounting for another timing offset between downlink transmission and uplink reception.

4. The method of claim 1, wherein the reference symbol is pre-compensated from a transmitter side.

5. The method of claim 1, wherein the reference symbol is generated based on a downlink channel state information reference signal sequence.

6. The method of claim 5, wherein a same channel state information reference signal sequence is used for generating the reference symbol and for downlink channel state information processing.

7. The method of claim 1, further comprising generating at least one channel estimate based on said processing.

8. The method of claim 1, further comprising generating antenna calibration coefficients based on said processing.

9. The method of claim 1, wherein said processing comprises applying a phase ramp in a frequency domain.

10. The method of claim 1, wherein said processing comprises using a priori information to account for the frame offset and/or any other timing offset between uplink reception and downlink transmission.

11. The method of claim 1, wherein said processing comprises removing time domain samples of the reference symbol corresponding to the cyclic shift length.

12. The method of claim 1, wherein said processing comprises cyclically shifting samples in a time domain.

13. The method of claim 1, wherein at least one remote radio unit performs at least a portion of said processing.

14. The method of claim 1, wherein fronthaul circuitry performs at least a portion of said processing.

15. The method of claim 1, wherein the frame offset is greater than the cyclic shift length.

16. The method of claim 1, wherein said receiving comprises a time domain duplex (TDD) reception.

17. The method of claim 1, wherein the first and second transmitted reference symbols are orthogonal frequency divisional multiplexing (OFDM) symbols.

18. A system for processing reference symbols, the system comprising:
   at least one antenna;
   a base band unit; and
   a radio frequency processing unit in communication with the base band unit;
   wherein the base band unit and radio frequency processing unit are together configured to:
      receive, from the at least one antenna, a reference symbol comprising a portion of a first transmitted reference symbol and a portion of a second transmitted reference symbol, wherein the first transmitted reference symbol comprises a symbol and a cyclically shifted portion of the symbol having a cyclic shift length, and wherein the second transmitted reference symbol comprises a cyclically shifted version of the first reference symbol that is cyclically shifted relative to the first transmitted reference symbol by the cyclic shift length; and
      process the reference symbol to account for (i) a frame offset between uplink symbols and downlink symbols and (ii) another timing offset between downlink transmission and uplink reception.

19. The system of claim 18, wherein the radio frequency processing unit is configured to remove time domain samples corresponding to the cyclic shift length from the reference symbol.

20. The system of claim 18, wherein the base band unit is configured to generate at least one channel estimate based on processing of the reference symbol.

* * * * *